United States Patent
M'Hamdi et al.

(10) Patent No.: US 12,547,901 B2
(45) Date of Patent: Feb. 10, 2026

(54) MULTILINGUAL SEMANTIC SEARCH UTILIZING META-DISTILLATION LEARNING

(71) Applicant: Adobe Inc., San Jose, CA (US)

(72) Inventors: Meryem M'Hamdi, Los Angeles, CA (US); Seunghyun Yoon, Seoul (KR); Franck Dernoncourt, Seattle, WA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 316 days.

(21) Appl. No.: 18/449,291

(22) Filed: Aug. 14, 2023

(65) Prior Publication Data

US 2025/0068924 A1    Feb. 27, 2025

(51) Int. Cl.
*G06N 3/096* (2023.01)
*G06F 40/30* (2020.01)
*G06F 40/40* (2020.01)

(52) U.S. Cl.
CPC ............. *G06N 3/096* (2023.01); *G06F 40/30* (2020.01); *G06F 40/40* (2020.01)

(58) Field of Classification Search
CPC .......... G06N 3/096; G06N 3/045; G06N 3/08; G06F 40/30; G06F 40/40
See application file for complete search history.

(56) References Cited

U.S. PATENT DOCUMENTS

2024/0256622 A1* 8/2024 Abrams .............. G06F 16/9538

OTHER PUBLICATIONS

Suvorov, BLOOM Overview, Mar. 13, 2023, https://medium.com/@alexander.suvorov/overview-a6ce99a827c4 (Year: 2023).*
Ma et al, Knowledge Distillation with Reptile Meta-Learning for Pretrained Language Model Compression, Proceedings of the 29th International Conference on Computational Linguistics, Oct. 12-17, 2022, pp. 4907-4917 (Year: 2022).*
Wang et al, Structure-Level Knowledge Distillation For Multilingual Sequence Labeling, May 4, 2020, https://arxiv.org/abs/2004.03846, pp. 1-14 (Year: 2020).*

(Continued)

*Primary Examiner* — Linda Wong
(74) *Attorney, Agent, or Firm* — Keller Preece PLLC

(57) ABSTRACT

The present disclosure relates to systems, non-transitory computer-readable media, and methods for providing multilingual semantic search results utilizing meta-learning and knowledge distillation. For example, in some implementations, the disclosed systems perform a first inner learning loop for a monolingual to bilingual meta-learning task for a teacher model. Additionally, in some implementations, the disclosed systems perform a second inner learning loop for a bilingual to multilingual meta-learning task for a student model. In some embodiments, the disclosed systems perform knowledge distillation based on the first inner learning loop for the monolingual to bilingual meta-learning task and the second inner learning loop for the bilingual to multilingual meta-learning task. Moreover, in some embodiments, the disclosed systems perform an outer learning loop and update parameters of a deep learning language model based on the first inner learning loop, the second inner learning loop, and the knowledge distillation.

20 Claims, 11 Drawing Sheets

(56) References Cited

OTHER PUBLICATIONS

Alexis Conneau, Kartikay Khandelwal, Naman Goyal, Vishrav Chaudhary, Guillaume Wenzek, Francisco Guzmán, Edouard Grave, Myle Ott, Luke Zettle moyer, and Veselin Stoyanov. 2020. Unsupervised cross-lingual representation learning at scale. In Proceedings of the 58th Annual Meeting of the Association for Computational Linguistics, pp. 8440-8451, Online. Association for Computational Linguistics.

Alexis Conneau, Ruty Rinott, Guillaume Lample, Adina Williams, Samuel Bowman, Holger Schwenk, and Veselin Stoyanov. 2018. XNLI: Evaluating cross-lingual sentence representations. In *Proceedings of the 2018 Conference on Empirical Methods in Natural Language Processing*, pp. 2475-2485, Brussels, Belgium. Association for Computational Linguistics.

Anna Langedijk, Verna Dankers, Phillip Lippe, Sander Bos, Bryan Cardenas Guevara, Helen Yannakoudakis, and Ekaterina Shutova. 2022. Meta-learning for fast cross-lingual adaptation in dependency parsing. In Proceedings of the 60th Annual Meeting of the Association for Computational Linguistics (Volume 1: Long Papers), pp. 8503-8520, Dublin, Ireland. Association for Computational Linguistics.

Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need. In Advances in Neural Information Processing Systems 30: Annual Conference on Neural Information Processing Systems 2017, Dec. 4-9, 2017, Long Beach, CA, USA, pp. 5998-6008.

Chelsea Finn, Pieter Abbeel, and Sergey Levine. 2017. Model-agnostic meta-learning for fast adaptation of deep networks. In Proceedings of the 34th International Conference on Machine Learning, ICML 2017, Sydney, NSW, Australia, Aug. 6-11, 2017, vol. 70 of Proceedings of Machine Learning Research, pp. 1126-1135. PMLR.

Chengye Lu, Yue Xu, and Shlomo Geva. 2008. Web-based query translation for English-Chinese CLIR. In International Journal of Computational Linguistics & Chinese Language Processing, vol. 13, No. 1, Mar. 2008: Special Issue on Cross-Lingual Information Retrieval and Question Answering, pp. 61-90.

Chong-En Lin and Kuan-Yu Chen. 2020. A preliminary study on using meta-learning technique for information retrieval. In Proceedings of the 32nd Conference on Computational Linguistics and Speech Processing (ROCLING 2020), pp. 59-71, Taipei, Taiwan. The Association for Computational Linguistics and Chinese Language Processing (ACLCLP).

Daniel Cer, Mona Diab, Eneko Agirre, Iñigo Lopez- Gazpio, and Lucia Specia. 2017. SemEval-2017 task 1: Semantic textual similarity multilingual and crosslingual focused evaluation. In Proceedings of the 11th International Workshop on Semantic Evaluation (SemEval-2017), pp. 1-14, Vancouver, 602 Canada. Association for Computational Linguistics.

Dong Nguyen, Arnold Overwijk, Claudia Hauff, Dolf Trieschnigg, Djoerd Hiemstra, and Franciska de Jong. 2008. Wikitranslate: Query translation for cross-lingual information retrieval using only wikipedia. In Evaluating Systems for Multilingual and Multimodal Information Access, 9th Workshop of the Cross-Language Evaluation Forum, CLEF 2008, Aarhus, Denmark, Sep. 17-19, 2008, Revised Selected Papers, vol. 5706 of Lecture Notes in Computer Science, pp. 58-65. Springer.

Doris Hoogeveen, Karin M. Verspoor, and Timothy Baldwin. 2015. Cqadupstack: A benchmark data set for community question-answering research. In Proceedings of the 20th Australasian Document Computing Symposium, ADCS 2015, Parramatta, NSW, Australia, Dec. 8-9, 2015, pp. 3:1-3:8. ACM.

Doron Laadan, Roman Vainshtein, Yarden Curiel, Gi-lad Katz, and Lior Rokach. 2019. Rankml: a meta learning-based approach for pre-ranking machine learning pipelines. ArXiv preprint, abs/1911.00108.

Farhad Nooralahzadeh, Giannis Bekoulis, JohannesBjerva, and Isabelle Augenstein. 2020. Zero-shot cross-lingual transfer with meta learning. In Proceedings of the 2020 Conference on Empirical Methods in Natural Language Processing (EMNLP), pp. 4547-4562, Online. Association for Computational Linguistics.

Florian Schroff, Dmitry Kalenichenko, and James Philbin. 2015. Facenet: A unified embedding for face recognition and clustering. In IEEE Conference on Computer Vision and Pattern Recognition, CVPR 2015, Boston, MA, USA, Jun. 7-12, 2015, pp. 815-824. IEEE Computer Society.

Gareth Jones, Fabio Fantino, Eamonn Newman, and Ying Zhang. 2008. Domain-specific query translation for multilingual information access using machine translation augmented with dictionaries mined from Wikipedia. In Proceedings of the 2nd workshop on Cross Lingual Information Access (CLIA) Addressing the Information Need of Multilingual Societies.

Genta Indra Winata, Samuel Cahyawijaya, Zhaojiang 864 Lin, Zihan Liu, Peng Xu, and Pascale Fung. 2020. Meta-transfer learning for code-switched speech recognition. In Proceedings of the 58th Annual Meeting of the Association for Computational Linguistics, pp. 3770-3776, Online. Association for Computational Linguistics.

Gregory Grefenstette. 1998. Cross language information retrieval. In Proceedings of the Third Conference of the Association for Machine Translation in the Americas: Tutorial Descriptions, Langhorne, PA, USA. Springer.

Haoran Xu, Seth Ebner, Mahsa Yarmohammadi, Aaron Steven White, Benjamin Van Durme, and Kenton Murray. 2021. Gradual fine-tuning for low-resource domain adaptation. In Proceedings of the Second Workshop on Domain Adaptation for NLP, pp. 214-221, Kyiv, Ukraine. Association for Computational Linguistics.

Hung-yi Lee, Shang-Wen Li, and Thang Vu. 2022. Meta learning for natural language processing: A survey. In Proceedings of the 2022 Conference of the North American Chapter of the Association for Computational Linguistics: Human Language Technologies, pp. 666-684, Seattle, United States. Association for Computational Linguistics.

Ilya Loshchilov and Frank Hutter. 2019. Decoupled weight decay regularization. In 7th International Conference on Learning Representations, ICLR 2019, New Orleans, LA, USA, May 6-9, 2019. OpenReview.net.

Ishan Tarunesh, Sushil Khyalia, Vishwajeet Kumar, Ganesh Ramakrishnan, and Preethi Jyothi. 2021. Meta-learning for effective multi-task and multilingual modelling. In Proceedings of the 16th Conference of the European Chapter of the Association for Computational Linguistics: Main Volume, pp. 3600-3612, Online. Association for Computational Linguistics.

Jacob Devlin, Ming-Wei Chang, Kenton Lee, and Kristina Toutanova. 2019. BERT: Pre-training of deep bidirectional transformers for language understanding. In Proceedings of the 2019 Conference of the North American Chapter of the Association for Computational Linguistics: Human Language Technologies, vol. 1 (Long and Short Papers), pp. 4171-4186, Minneapolis, Minnesota. Association for Computational Linguistics.

Jacques Savoy and Martin Braschler. 2019. Lessons Learnt from Experiments on the Ad Hoc Multilingual Test Collections at CLEF, pp. 177-200. Springer International Publishing, Cham.

Jeffrey Zhu, Mingqin Li, Jason Li, and Cassandra Odoula. 2021. Bing delivers more contextualized search using quantized transformer inference on nvidia gpus in azure.

Jianmo Ni, Gustavo Hernandez Abrego, Noah Constant, Ji Ma, Keith Hall, Daniel Cer, and Yinfei Yang. 2022. Sentence-t5: Scalable sentence encoders from pre-trained text-to-text models. In Findings of the Association for Computational Linguistics: ACL 2022, pp. 1864-1874, Dublin, Ireland. Association for Computational Linguistics.

Jiatao Gu, Yong Wang, Yun Chen, Victor O. K. Li, and Kyunghyun Cho. 2018. Meta-learning for low-resource neural machine translation. In Proceedings of the 2018 Conference on Empirical Methods in Natural Language Processing, pp. 3622-3631, Brussels, Belgium. Association for Computational Linguistics.

Jihao Liu, Boxiao Liu, Hongsheng Li, and Yu Liu. 2022. Meta knowledge distillation. ArXiv preprint, abs/2202.07940.

(56) References Cited

OTHER PUBLICATIONS

Jonathan H. Clark, Eunsol Choi, Michael Collins, Dan Garrette, Tom Kwiatkowski, Vitaly Nikolaev, and Jennimaria Palomaki. 2020. TyDi QA: A benchmark for information-seeking question answering in typo logically diverse languages. Transactions of the Association for Computational Linguistics, 8:454-470.

Jui-Yang Hsu, Yuan-Jui Chen, and Hung-yi Lee. 2020. Meta learning for end-to-end low-resource speech recognition. In 2020 IEEE International Conference on Acoustics, Speech and Signal Processing, ICASSP 2020, Barcelona, Spain, May 4-8, 2020, pp. 7844-7848. IEEE.

Meryem M'hamdi, Doo Soon Kim, Franck Dernoncourt, Trung Bui, Xiang Ren, and Jonathan May 2021. X-METRA-ADA: Cross-lingual meta-transfer learning adaptation to natural language understanding and question answering. In Proceedings of the 2021 Conference of the North American Chapter of the Association for Computational Linguistics: Human Language Technologies, pp. 3617-3632, On line. Association for Computational Linguistics.

Michał Ziemski, Marcin Junczys-Dowmunt, and Bruno Pouliquen. 2016. The United Nations parallel corpus v1.0. In Proceedings of the Tenth International Conference on Language Resources and Evaluation (LREC'16), pp. 3530-3534, Portoro, Slovenia. European Language Resources Association (ELRA).

Mikel Artetxe, Sebastian Ruder, and Dani Yogatama. 2020. On the cross-lingual transferability of mono-lingual representations. In Proceedings of the 58th Annual Meeting of the Association for Computational Linguistics, pp. 4623-4637, Online. Association for Computational Linguistics.

Min Zhang, Donglin Wang, and Sibo Gai. 2020. Knowledge distillation for model-agnostic meta- learning. In ECAI 2020—24th European Conference on Artificial Intelligence, Aug. 29-Sep. 8, 2020, Santiago de Compostela, Spain, Aug. 29-Sep. 8, 2020—Including 10th Conference on Prestigious Applications of Artificial Intelligence (PAIS 2020), vol. 325 of Frontiers in Artificial Intelligence and Applications, pp. 1355-1362. IOS Press.

Niels van der Heijden, Helen Yannakoudakis, Pushkar Mishra, and Ekaterina Shutova. 2021. Multilingual and cross-lingual document classification: A meta-learning approach. In Proceedings of the 16th Conference of the European Chapter of the Association for Computational Linguistics: Main Volume: pp. 1966-1976, Online. Association for Computational Linguistics.

Niklas Muennighoff. 2022. SGPT: GPT sentence embeddings for semantic search. ArXiv preprint,abs/2202.08904.

Nils Reimers and Iryna Gurevych. 2019. Sentence—BERT: Sentence embeddings using Siamese BERT-networks. In Proceedings of the 2019 Conference on Empirical Methods in Natural Language Processing and the 9th International Joint Conference on Natural Language Processing (EMNLP-IJCNLP), pp. 3982-3992, Hong Kong, China. Association for Computational Linguistics.

Nils Reimers and Iryna Gurevych. 2020. Making monolingual sentence embeddings multilingual using knowledge distillation. In Proceedings of the 2020 Conference on Empirical Methods in Natural Language Processing (EMNLP), pp. 4512-4525, Online. Association for Computational Linguistics.

Pandu Nayak. Understanding searches better than ever before. Google; The Keyword. 3 pages. Oct. 25, 1029.

Patrick Lewis, Barlas Oguz, Ruty Rinott, Sebastian Riedel, and Holger Schwenk. 2020. MLQA: Evaluating cross-lingual extractive question answering. In Proceedings of the 58th Annual Meeting of the Association for Computational Linguistics, pp. 7315-7330, Online. Association for Computational Linguistics.

Pierre Zweigenbaum, Serge Sharoff, and Reinhard Rapp. 2018. Overview of the third BUCC shared task: Spot-ting parallel sentences in comparable corpora. In 11th Workshop on Building and Using Comparable Corpora—Special Topic: Comparable Corpora for Asian Languages, BUCC@LREC 2018, Miyazaki, Japan, May 8, 2018. European Language Resources Association.

Robert Litschko, Ivan Vulic, Simone Paolo Ponzetto, and Goran Glavas. 2022. On cross-lingual retrieval with multilingual text encoders. Inf. Retr. J., 25(2):149-183.

Sebastien M. R. Arnold, Praateek Mahajan, Debajyoti Datta, Ian Bunner, and Konstantinos Saitas Zarkias. 2020. learn2learn: A library for meta-learning research.

Sebastian Ruder, Noah Constant, Jan Botha, Aditya SID-dhant, Orhan Firat, Jinlan Fu, Pengfei Liu, Junjie Hu, Dan Garrette, Graham Neubig, and Melvin Johnson. 2021. XTREME-R: Towards more challenging and nuanced multilingual evaluation. In Proceedings of the 2021 Conference on Empirical Methods in Natural Language Processing, pp. 10215-10245, Online and Punta Cana, Dominican Republic. Association for Computational Linguistics.

Sebastian Schuster, Sonal Gupta, Rushin Shah, and Mike Lewis. 2019. Cross-lingual transfer learning for multilingual task oriented dialog. In Proceedings of the 2019 Conference of the North American Chapter of the Association for Computational Linguistics: Human Language Technologies, vol. 1 (Long and Short Papers), pp. 3795-3805, Minneapolis, Minnesota. Association for Computational Linguistics.

Shanu Kumar, Sandipan Dandapat, and Monojit Choudhury. 2022. "diversity and uncertainty in moderation" are the key to data selection for multilingual few-shot transfer. In Findings of the Association for Computational Linguistics: NAACL 2022, pp. 1042-1055, Seattle, United States. Association for Computational Linguistics.

Stephen E. Robertson and Hugo Zaragoza. 2009. The probabilistic relevance framework: BM25 and beyond. Found. Trends Inf. Retr., 3(4):333-389.

Tao Lei, Hrishikesh Joshi, Regina Barzilay, Tommi Jaakkola, Kateryna Tymoshenko, Alessandro Moschitti, and Lluís Màrquez. 2016. Semi-supervised question retrieval with gated convolutions. In Proceedings of the 2016 Conference of the North American Chapter of the Association for Computational Linguistics: Human Language Technologies, pp. 1279-1289, San Diego, California. Association for Computational Linguistics.

Timothy M. Hospedales, Antreas Antoniou, Paul Micaelli, and Amos J. Storkey. 2020. Meta-learning in neural networks: A survey. CoRR, abs/2004.05439.

Uma Roy, Noah Constant, Rami Al-Rfou, Aditya Barua, Aaron Phillips, and Yinfei Yang. 2020. LAReQA: Language-agnostic answer retrieval from a multilingual pool. In Proceedings of the 2020 Conference on Empirical Methods in Natural Language Processing (EMNLP), pp. 5919-5930, Online. Association for Computational Linguistics.

Vitor R Carvalho, Jonathan L Elsas, William W Cohen, and Jaime G Carbonell. 2008. A meta-learning approach for robust rank learning. In SIGIR 2008 work-shop on learning to rank for information retrieval, vol. 1.

Wangchunshu Zhou, Canwen Xu, and Julian McAuley. 2022. BERT learns to teach: Knowledge distillation with meta learning. In *Proceedings of the 60th Annual Meeting of the Association for Computational Linguistics (Volume 1: Long Papers)*, pp. 7037-7049, Dublin, Ireland. Association for Computational Linguistics.

Weiting Tan, Kevin Heffernan, Holger Schwenk, and Philipp Koehn. 2023. Multilingual representation distillation with contrastive learning. In Proceedings of the 17th Conference of the European Chapter of the Association for Computational Linguistics, pp. 1477-1490, Dubrovnik, Croatia. Association for Computational Linguistics.

Yi-Chen Chen, Jui-Yang Hsu, Cheng-Kuang Lee, and Hung-yi Lee. 2020. DARTS-ASR: differentiable architecture search for multilingual speech recognition and adaptation. In Interspeech 2020, 21st Annual Conference of the International Speech Communication Association, Virtual Event, Shanghai, China, Oct. 25-29, 2020, pp. 1803-1807. ISCA.

Yinfei Yang, Daniel Cer, Amin Ahmad, Mandy Guo, Jax Law, Noah Constant, Gustavo Hernandez Abrego, Steve Yuan, Chris Tar, Yun-hsuan Sung, Brian Strope, and Ray Kurzweil. 2020. Multilingual universal sentence encoder for semantic retrieval. In Proceedings of the 58th Annual Meeting of the Association for Computational Linguistics: System Demonstrations, pp. 87-94, Online. Association for Computational Linguistics.

Yubei Xiao, Ke Gong, Pan Zhou, Guolin Zheng, Xiaodan Liang, and Liang Lin. 2021. Adversarial meta sampling for multilingual low-resource speech recognition. In Thirty-Fifth AAAI Conference on Artificial Intelligence, AAAI 2021, Thirty-Third Conference on

(56) References Cited

OTHER PUBLICATIONS

Innovative Applications of Artificial Intelligence, IAAI 2021, The Eleventh Symposium on Educational Advances in Artificial Intelligence, EAAI 2021, Virtual Event, Feb. 2-9, 2021, pp. 14112-14120. AAAI Press.

Zhuolin Jiang, Amro El-Jaroudi, William Hartmann, Damianos Karakos, and Lingjun Zhao. 2020. Crosslingual information retrieval with BERT. In Proceedings of the workshop on Cross-Language Search and Summarization of Text and Speech (CLSSTS2020), pp. 26-31, Marseille, France. European Language Resources Association.

* cited by examiner

MULTILINGUAL SEMANTIC SEARCH UTILIZING META-DISTILLATION LEARNING

BACKGROUND

Recent years have seen developments in hardware and software platforms implementing semantic search. For example, conventional semantic search systems are able to identify a contextual meaning of a search query and provide search results tailored to the contextual meaning. To illustrate, conventional semantic search systems identify a contextual meaning of a search query based on relative positions of words within the query. Despite these developments, conventional systems suffer from a number of technical deficiencies, including inflexibility and inefficiency.

BRIEF SUMMARY

Embodiments of the present disclosure provide benefits and/or solve one or more problems in the art with systems, non-transitory computer-readable media, and methods for learning parameters of a language model utilizing meta-learning and knowledge distillation to cause the language model to perform multilingual search retrieval. To illustrate, in some embodiments, the disclosed systems utilize meta-distillation learning based on model-agnostic meta-learning (MAML) to train the language model to provide multilingual semantic search results. Moreover, in some implementations, the disclosed systems leverage MAML in an alignment approach (MAML-Align) to distill knowledge from a teacher model to a student model. In particular, in some implementations, the disclosed systems utilize the teacher model to transfer from monolingual semantic search to bilingual semantic search. Additionally, in some implementations, the disclosed systems utilize the student model to transfer from bilingual semantic search to multilingual semantic search. Furthermore, in some embodiments, the disclosed systems distill knowledge from the teacher model to the student model. Based on meta-learning with the teacher model and the student model, and based on the knowledge distillation between the teacher model and the student model, in some embodiments, the disclosed systems update parameters of the language model to perform multilingual semantic search.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
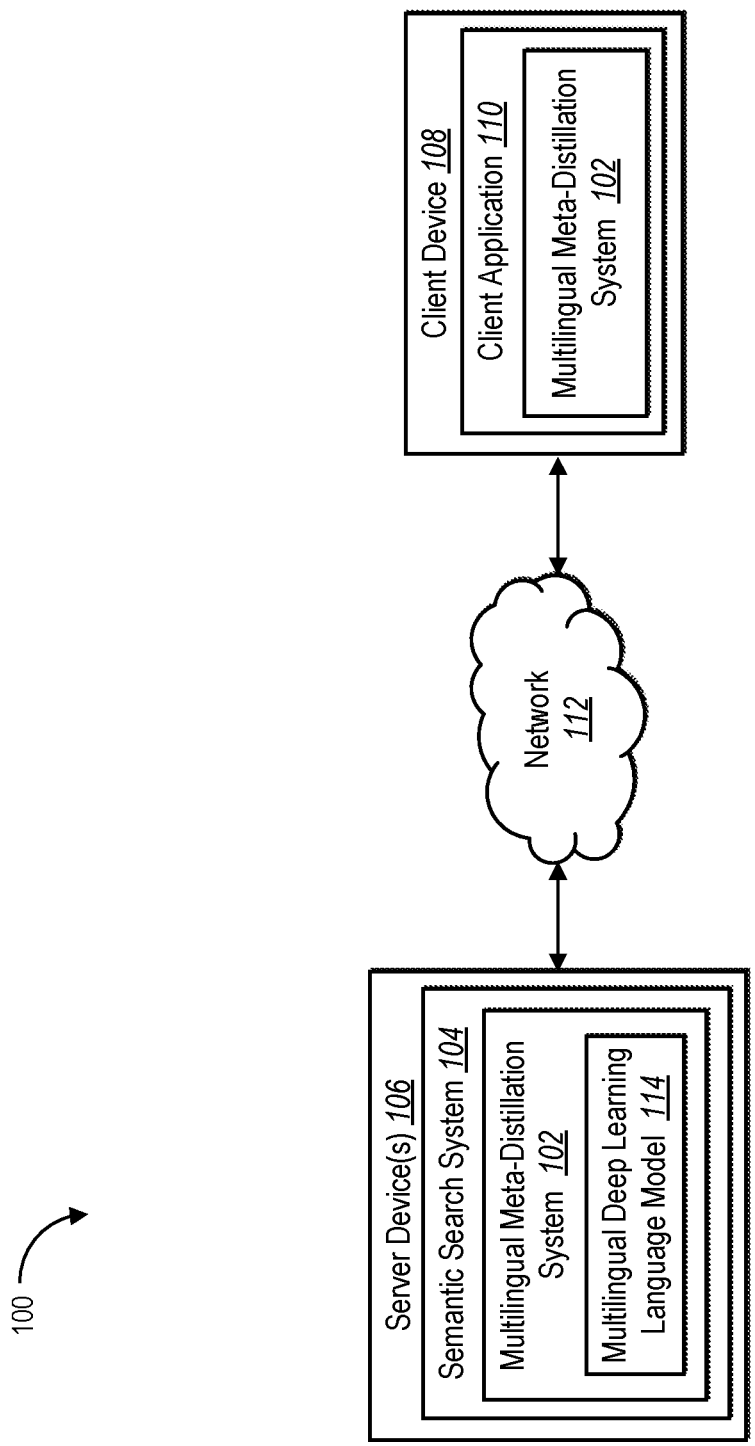
FIG. 1 illustrates a diagram of an environment in which a multilingual meta-distillation system operates in accordance with one or more embodiments.

This disclosure describes one or more embodiments of a multilingual meta-distillation system that learns parameters of a deep learning language model utilizing meta-learning and knowledge distillation to perform multilingual semantic search. For example, the multilingual meta-distillation system utilizes model-agnostic meta-learning (MAML) to train the deep learning language model to provide multilingual semantic search results. Moreover, in some implementations, the multilingual meta-distillation system leverages MAML in an alignment approach (MAML-Align) to distill knowledge from a teacher meta-transfer model to a student meta-transfer model. In particular, in some implementations, the multilingual meta-distillation system utilizes the teacher meta-transfer model to transfer from monolingual semantic search to bilingual semantic search. Additionally, in some implementations, the multilingual meta-distillation system utilizes the student meta-transfer model to transfer from bilingual semantic search to multilingual semantic search. Furthermore, in some embodiments, the multilingual meta-distillation system distills knowledge from the teacher meta-transfer model to the student meta-transfer model. In some embodiments, based on meta-learning with the teacher meta-transfer model and the student meta-transfer model, and based on the knowledge distillation between the teacher meta-transfer model and the student meta-transfer model, the multilingual meta-distillation system updates parameters of the deep learning language model to perform multilingual semantic search.

As just mentioned, in some implementations, the multilingual meta-distillation system utilizes MAML optimization techniques to learn parameters of a language model to perform multilingual semantic search. For instance, in some embodiments, the multilingual meta-distillation system utilizes meta-learning to transfer from monolingual semantic search to multilingual semantic search. To illustrate, the multilingual meta-distillation system performs an inner learning loop to train the language model on a support set. Then, in some cases, the multilingual meta-distillation system accumulates losses on a query set to update parameters of the language model. In some implementations, the multilingual meta-distillation system utilizes meta-learning as an upstream framework to learn the parameters of the language model, which are then applied in a downstream application of multilingual semantic search.

As also mentioned, in some implementations, the multilingual meta-distillation system utilizes MAML-Align optimization techniques to learn parameters of a language model to perform multilingual semantic search. For example, in some embodiments, the multilingual meta-distillation system utilizes both meta-learning and knowledge distillation to learn the parameters. To illustrate, the multilingual meta-distillation system utilizes the meta-learning teacher model to transfer from monolingual semantic search to bilingual semantic search, and the meta-learning student model to transfer from bilingual semantic search to multilingual semantic search. In some cases, by utilizing these two meta-learning models with an overlapping semantic search task (i.e., bilingual semantic search), the multilingual meta-distillation system improves the transfer from monolingual semantic search to multilingual semantic search. Moreover, in some implementations, the multilingual meta-distillation system utilizes knowledge distillation to align the meta-learning student model with the meta-learning teacher model.

To illustrate, in some implementations, the multilingual meta-distillation system performs an inner learning loop to train the language model on a support set for the teacher model and a support set for the student model. Then, the multilingual meta-distillation system accumulates losses on the support set for the student model, which serves as a query set for the teacher model. Additionally, the multilingual meta-distillation system determines losses on the query set and the support set for the teacher model. The multilingual meta-distillation system performs knowledge distillation by comparing the losses on the query set for the teacher model with the losses on the support set for the student model. Utilizing these losses, the multilingual meta-distillation system performs an outer learning loop to update parameters of the language model, thereby training the language model to perform multilingual semantic search.

In some embodiments, the multilingual meta-distillation system utilizes both meta-learning and knowledge distillation as an upstream framework to learn parameters of the language model. As with MAML, in some embodiments, the multilingual meta-distillation system utilizes MAML-Align to train the language model and then applies the language model in a downstream task of multilingual semantic search. To illustrate, in some implementations, the multilingual meta-distillation system performs the inner learning loop (in MAML) or inner learning loops (in MAML-Align) as a task-specific optimization of the meta-learning model(s) using the downstream model (e.g., the language model), and performs the outer learning loop (in MAML and MAML-Align) as a meta optimization of the downstream model.

Although conventional systems can provide semantic search results based on a contextual meaning of a search query, such systems have a number of problems in relation to flexibility of operation and efficiency. For instance, conventional systems often inflexibly limit search results to the same language as the search. Additionally, conventional systems often are unable to provide search results including results in multiple languages.

Moreover, conventional systems often lack an ability to efficiently train language models to provide multilingual semantic search. In particular, conventional systems often require large training datasets and careful fine tuning of parameters to create language models.

The multilingual meta-distillation system provides a variety of technical advantages relative to conventional systems. For example, by utilizing meta-learning and/or knowledge distillation, the multilingual meta-distillation system improves flexibility relative to conventional systems. Specifically, the multilingual meta-distillation system extends meta-learning to applications of multilingual semantic search. Thus, the multilingual meta-distillation system generalizes language models to multilingual use cases, including unseen languages. In particular, the multilingual meta-distillation system trains the language models to perform semantic search that can involve search inputs in multiple languages, search results in multiple languages, or a combination of search inputs in multiple languages and search results in multiple languages. Additionally, the multilingual meta-distillation system trains the language model to perform semantic search in languages not seen during training (i.e., zero-shot semantic search).

In addition, the multilingual meta-distillation system improves efficiency (relative to conventional systems) of learning language model parameters by training the language model in increments (e.g., monolingual to bilingual, and then bilingual to multilingual). Thus, the multilingual meta-distillation system reduces the amount of data required and is well-suited for low-resource scenarios. For instance, by utilizing meta-learning techniques that do not require large training datasets, the multilingual meta-distillation system is computationally efficient. Furthermore, by utilizing knowledge distillation together with meta-learning, in some cases, the multilingual meta-distillation system improves upon conventional systems by transferring from monolingual search tasks to multilingual search tasks with increased accuracy.

Additional detail will now be provided in relation to illustrative figures portraying example embodiments and implementations of a multilingual meta-distillation system. For example, FIG. 1 illustrates a system 100 (or environment) in which a multilingual meta-distillation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a semantic search system 104 that further includes the multilingual meta-distillation system 102. In some embodiments, the multilingual meta-distillation system 102 learns parameters of a deep learning language model to cause the deep learning language model to perform multilingual semantic search. In some embodiments, the multilingual meta-distillation system 102 implements the deep learning language model to perform semantic search. In some embodiments, the server device(s) 106 includes, but is not limited to, a computing device (such as explained below with reference to FIG. 10).

In some instances, the multilingual meta-distillation system 102 receives a request (e.g., from the client device 108) to generate or retrieve a search result. For example, the multilingual meta-distillation system 102 receives a user interaction requesting a semantic search, and utilizes a multilingual deep learning language model 114 to generate a multilingual search result. Some embodiments of server device(s) 106 perform a variety of functions via the semantic search system 104 on the server device(s) 106. To illustrate, the server device(s) 106 (through the multilingual meta-distillation system 102 on the semantic search system 104) performs functions such as, but not limited to, performing one or more inner learning loops for semantic search tasks, performing knowledge distillation between meta-learner models, and performing an outer learning loop to update parameters of the multilingual deep learning language model 114. In some embodiments, the server device(s) 106 utilizes the multilingual deep learning language model 114 to generate multilingual sentence-level search results. In some embodiments, the server device(s) 106 trains the multilingual deep learning language model 114 as described herein.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 10. Some embodiments of client device 108 perform a variety of functions via a client application 110 on client device 108. For example, the client device 108 (through the client application 110) performs functions such as, but not limited to, performing one or more inner learning loops for semantic search tasks, performing knowledge distillation between meta-learner models, and performing an outer learning loop to update parameters of the multilingual deep learning language model 114. In some embodiments, the client device 108 utilizes the multilingual deep learning language model 114 to generate multilingual sentence-level search results. In some embodiments, the client device 108 trains the multilingual deep learning language model 114 as described herein.

To access the functionalities of the multilingual meta-distillation system 102 (as described above and in greater detail below), in one or more embodiments, a user interacts with the client application 110 on the client device 108. For example, the client application 110 includes one or more software applications (e.g., to train a language model or to perform semantic search in accordance with one or more embodiments described herein) installed on the client device 108, such as a semantic search application. In certain instances, the client application 110 is hosted on the server device(s) 106. Additionally, when hosted on the server device(s) 106, the client application 110 is accessed by the client device 108 through a web browser and/or another online interfacing platform and/or tool.

As illustrated in FIG. 1, in some embodiments, the multilingual meta-distillation system 102 is hosted by the client application 110 on the client device 108 (e.g., additionally or alternatively to being hosted by the semantic search system 104 on the server device(s) 106). For example, the multilingual meta-distillation system 102 performs the meta-learning and knowledge distillation (meta-distillation) learning techniques described herein on the client device 108. In some implementations, the multilingual meta-distillation system 102 utilizes the server device(s) 106 to train and implement machine learning models (e.g., the multilingual deep learning language model 114, the meta-learning teacher model, and/or the meta-learning student model). In one or more embodiments, the multilingual meta-distillation system 102 utilizes the server device(s) 106 to train the machine learning models and utilizes the client device 108 to implement or apply the machine learning models.

Further, although FIG. 1 illustrates the multilingual meta-distillation system 102 being implemented by a particular component and/or device within the system 100 (e.g., the server device(s) 106 and/or the client device 108), in some embodiments the multilingual meta-distillation system 102 is implemented, in whole or in part, by other computing devices and/or components in the system 100. For instance, in some embodiments, the multilingual meta-distillation system 102 is implemented on another client device. More specifically, in one or more embodiments, the description herein of (and acts performed by) the multilingual meta-distillation system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., user interactions). In response, the multilingual meta-distillation system 102 on the server device(s) 106 performs operations described herein to generate multilingual search results. The server device(s) 106 provides the output or results of the operations (e.g., multilingual search results in a plurality of languages) to the client device 108. As another example, in some implementations, the multilingual meta-distillation system 102 on the client device 108 performs operations described herein to generate multilingual search results. The client device 108 provides the output or results of the operations (e.g., multilingual search results in a plurality of languages) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 10. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2:
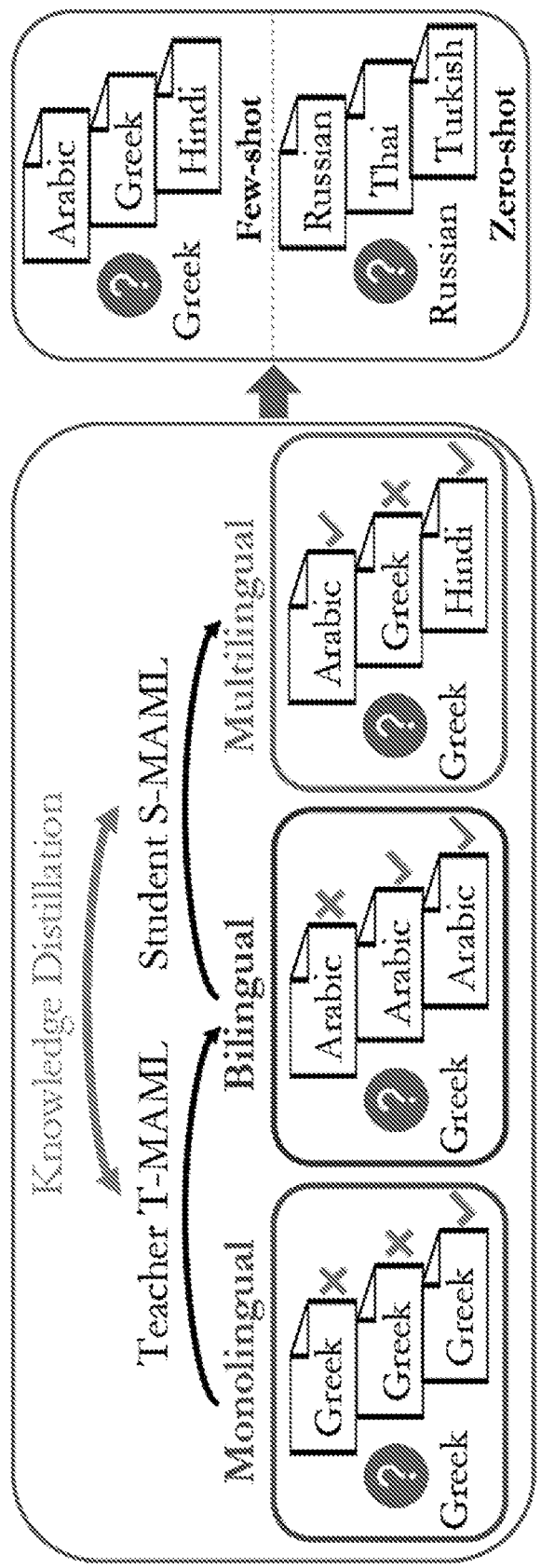
FIG. 2 illustrates the multilingual meta-distillation system utilizing meta-learning and knowledge distillation to perform multilingual semantic search in accordance with one or more embodiments.

As mentioned above, in some embodiments, the multilingual meta-distillation system 102 utilizes meta-learning and knowledge distillation to learn parameters of a deep learning language model. For instance, FIG. 2 illustrates the multilingual meta-distillation system 102 transferring from monolingual semantic search to bilingual semantic search utilizing a teacher model, transferring from bilingual semantic search to multilingual semantic search utilizing a student model, and utilizing knowledge distillation to align the teacher model and the student model, in accordance with one or more embodiments.

In some embodiments, a deep learning language model (or language model) includes a machine learning model, such as a neural network, trained or trainable to perform semantic search. A machine learning model includes a computer representation that is tunable (e.g., trained) based on inputs to approximate unknown functions used for generating corresponding outputs. In particular, in one or more embodiments, a machine learning model is a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), association rule learning, inductive logic programming, support vector learning, Bayesian networks, a regression-based model (e.g., censored regression), principal component analysis, a transformer-based model, a diffusion model, or a combination thereof.

In some embodiments, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network includes various layers such as an input layer, one or more hidden layers, and an output layer that each perform tasks for processing data. For example, a neural network includes a deep neural network, a convolutional neural network, a recurrent neural network (e.g., an LSTM), a graph neural network, a transformer, a diffusion model, or a generative adversarial neural network.

In some embodiments, the deep learning language model is a transformer-based neural network. In some implementations, a transformer-based neural network includes an artificial neural network or a portion of an artificial neural network that utilizes self-attention to differentially weight various parts of input data while handling long-range dependencies in a sequential task. To illustrate, a transformer-based neural network preserves intermediate contextual features for further analysis by another portion of the artificial neural network, or by another artificial neural network.

In some embodiments, monolingual semantic search includes retrieving relevant content in response to a search query expressed in a single language from candidate contents expressed in the same language (as the search query). In some embodiments, bilingual semantic search includes retrieving relevant content in response to a search query expressed in a single first language from candidate contents expressed in a single, different, second language. In some embodiments, multilingual semantic search (or multilingual search retrieval) includes retrieving relevant content in response to a search query expressed in a subset of multiple languages from a pool of candidates expressed in a subset of multiple languages. For instance, multilingual semantic search includes receiving a search query in a first language (and possibly additional languages) and retrieving relevant content in a plurality of languages. For example, the plurality of languages includes the first language and a second language. As another example, the plurality of languages includes the second language and a third language, but not the first language.

Specifically, FIG. 2 shows the multilingual meta-distillation system 102 utilizing a meta-learner teacher model (e.g., Teacher T-MAML) to transfer from monolingual semantic search to bilingual semantic search. For example, the multilingual meta-distillation system 102 utilizes a pre-trained learner for monolingual semantic search tasks to learn parameters of the meta-learner teacher model to perform bilingual semantic search tasks. For instance, the multilingual meta-distillation system 102 processes a training dataset with meta-tasks through the teacher model and updates parameters of the teacher model based on task losses. By way of example and not limitation, FIG. 2 illustrates the teacher model transferring from a monolingual task of evaluating and providing search results in Greek in response to a search input in Greek, to a bilingual task of evaluating and providing search results in Arabic in response to a search input in Greek.

Additionally, FIG. 2 shows the multilingual meta-distillation system 102 utilizing a meta-learner student model (e.g., Student S-MAML) to transfer from bilingual semantic search to multilingual semantic search. For example, the multilingual meta-distillation system 102 utilizes a pre-trained learner to learn parameters of the meta-learner student model to perform multilingual semantic search tasks. For instance, the multilingual meta-distillation system 102 processes a training dataset with meta-tasks through the student model and updates parameters of the student model based on task losses. By way of example and not limitation, FIG. 2 illustrates the student model transferring from a bilingual task of evaluating and providing search results in Arabic in response to a search input in Greek, to a multilingual task of evaluating and providing search results in Arabic, Greek, and Hindi in response to a search input in Greek.

In some implementations, a meta-learner (e.g., a meta-learning teacher model, a meta-learning student model, an alignment learner, etc.) includes a machine learning model that is trainable to perform semantic search tasks, and to transfer from one semantic search task to another, different semantic search task. For instance, the multilingual meta-distillation system 102 learns parameters of a meta-learning utilizing meta-learning. In some embodiments, meta-learning includes training a model to optimize (or improve) parameters that minimize (or reduce) a loss function, in which the model uses some pre-acquired knowledge or assumption on how to learn. For example, in some embodiments, meta-learning includes learning to learn, such as improving a learning algorithm over multiple tasks.

FIG. 2 further shows the multilingual meta-distillation system 102 utilizing an alignment approach (e.g., MAML-Align) to distill knowledge from the meta-learner teacher model to the meta-learner student model. As described in additional detail below, the multilingual meta-distillation system 102 utilizes knowledge distillation to enhance the portability of the teacher and student models by bridging the gap between different cross-lingual meta-transfer learning models and enhancing the alignment between them. In some embodiments, knowledge distillation includes transferring knowledge from a teacher model to a student model.

As shown in FIG. 2, in some embodiments, the multilingual meta-distillation system 102 applies the teacher and student models to perform semantic search. For instance, the multilingual meta-distillation system 102 utilizes few-shot learning to perform multilingual semantic search in languages seen during training. By way of example and not limitation, FIG. 2 illustrates the multilingual meta-distillation system 102 evaluating and providing search results in Arabic, Greek, and Hindi in response to a search input in Greek.

Additionally, in some implementations, the multilingual meta-distillation system 102 utilizes zero-shot learning to perform multilingual semantic search in languages unseen during training. By way of example and not limitation, FIG. 2 illustrates the multilingual meta-distillation system 102 evaluating and providing search results in Russian, Thai, and Turkish in response to a search input in Russian.

In some embodiments, the multilingual meta-distillation system 102 receives search inputs in multiple languages and provides search results in a single language. Moreover, in some embodiments, the multilingual meta-distillation system 102 receives search inputs in multiple languages and provides search results in multiple languages.

Figure 3:
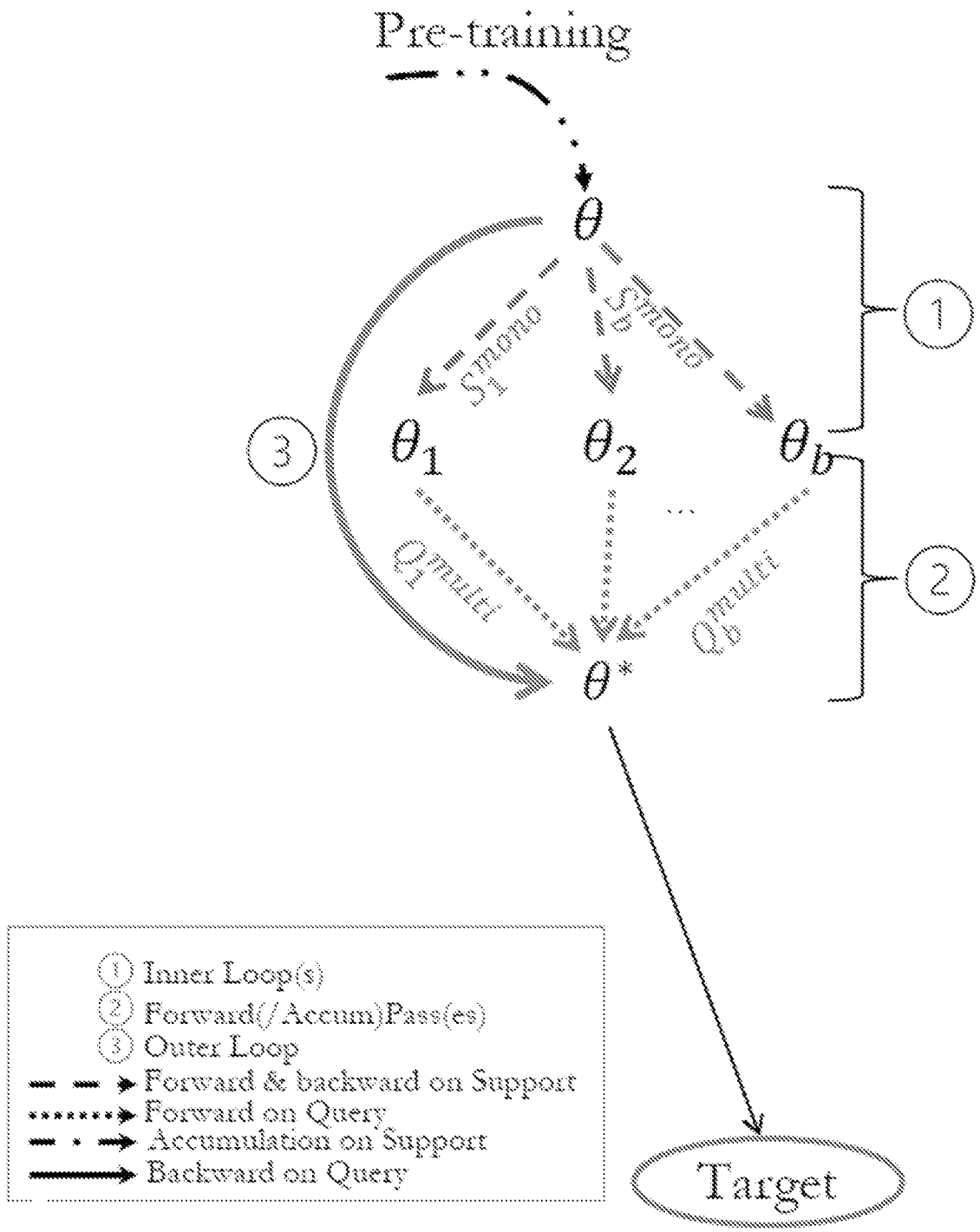
FIG. 3 illustrates the multilingual meta-distillation system utilizing model-agnostic meta-learning for multilingual semantic search in accordance with one or more embodiments.

As mentioned, in some embodiments, the multilingual meta-distillation system 102 utilizes model-agnostic meta-learning (MAML) to train a language model to perform multilingual semantic search. For instance, FIG. 3 illustrates the multilingual meta-distillation system 102 utilizing MAML for multilingual semantic search in accordance with one or more embodiments. Specifically, in some embodiments, the multilingual meta-distillation system 102 utilizes a single meta-learning model to transfer from monolingual semantic search tasks to multilingual semantic search tasks.

To illustrate, FIG. 3 shows the multilingual meta-distillation system 102 receiving parameters of a pre-trained learner. The multilingual meta-distillation system 102 initializes meta-learner parameters θ with the pre-trained learner parameters. The multilingual meta-distillation system 102 samples a batch of meta-tasks from a meta-dataset distribution that simulates the transfer from a first task to a different second task. For instance, the first task is a monolingual or a bilingual search, and the second task is a bilingual or a multilingual search. As shown in FIG. 3, the multilingual meta-distillation system 102 samples a batch of meta-tasks that simulate transfer from monolingual search to multilingual search.

In some cases, a batch of meta-tasks includes a batch of monolingual to multilingual meta-learning tasks. In some cases, a batch of meta-tasks includes a batch of monolingual to bilingual meta-learning tasks. In some cases, a batch of meta-tasks includes a batch of bilingual to multilingual meta-learning tasks. To illustrate, in some implementations, the multilingual meta-distillation system 102 retrieves relevant content from a set of contents in one or more languages. The retrieved contents include, in one or more embodiments, sentences or passages, and correspond to multiple languages for a particular search query. A meta-task includes, in one or more embodiments, retrieving content (e.g., an answer to a question) that is approximately the same length and format as the search query. Conversely, a meta-task includes, in one or more alternative embodiments, retrieving content that is not the same length and format as the search query. For example, the content is a passage (e.g., one or more paragraphs) answering a sentence-level question.

For each batch of meta-tasks, the multilingual meta-distillation system 102 performs an inner learning loop over each meta-task. The multilingual meta-distillation system 102 updates parameters $\theta_j = \theta_1, \theta_2, \ldots, \theta_b$ using a support set $S_1, S_2, \ldots, S_b$ for the first task (e.g., monolingual search). In particular, the multilingual meta-distillation system 102 updates the parameters based on a support loss for the first task. Additionally, the multilingual meta-distillation system 102 generates a query loss based on the updated parameters.

As mentioned, at the end of the inner loop, the multilingual meta-distillation system 102 determines gradients with respect to a query loss of the parameters $\theta_j$ using a query set $Q_1, Q_2, \ldots, Q_b$ for the different second task (e.g., multilingual search). This is shown in FIG. 3 as the forward pass. In some implementations, the multilingual meta-distillation system 102 ensures that the query set does not overlap the support set. For example, in some implementations, the multilingual meta-distillation system 102 trains the meta-learning model with one set (e.g., the support set) and validates the meta-learning model with a different set (e.g., the query set).

As also shown in FIG. 3, after the forward pass over the meta-tasks of the batch, the multilingual meta-distillation system 102 performs an outer learning loop by summing the determined gradients and updating the parameters θ of the language model (shown as θ*). The MAML process as described herein is represented symbolically in Algorithm 1. Algorithm 1 utilizes an inner loop that is shown in Algorithm 2, both of which follow below.

---

Algorithm 1: MAML - Transfer Learning from X to X' (X → X')

---

Obtain task set distribution $\mathcal{D}_{X \to X'}$ simulating transfer from X to X' task language variants, pretrained learner B with parameters $\theta_B$, and meta-learner M with parameters (θ, α, β, n).
1:    Initialize $\theta \leftarrow \theta_B$
2:    while not done do
3:      Sample a batch of tasks $\mathcal{T} = \{T_1, \ldots, T_b\} \sim \mathcal{D}_{X \to X'}$ 4:      $\mathcal{L}_{T_j}^{S_j^X}, \mathcal{L}_{T_j}^{Q_j^{X'}} (B_{\theta_j}) = \text{INNER\_LOOP}(\mathcal{T}, \theta, \alpha, n)$ 5:      Outer Loop: Update $\theta \leftarrow \theta - \beta \nabla_\theta \Sigma_{j=1}^{b} \mathcal{L}_{T_j}^{Q_j^{X'}} (B_{\theta_j})$
6:    end while

--- where α and β are learning rates for the inner loop and the outer loop, respectively.

The function INNER_LOOP referenced in Algorithm 1 represents the inner learning loop described herein, and is represented in Algorithm 2:

---

Algorithm 2: INNER_LOOP

---

1:    function INNER_LOOP($\mathcal{T}$, θ, α, n)
2:    for each $T_j = (S_j^X, Q_j^{X'})$ in $\mathcal{T}$ do
3:      Initialize $\theta_j \leftarrow \theta$
4:      for t = 1 … n do 5:        Evaluate $\dfrac{\partial B_{\theta_j}}{\partial \theta_j} = \nabla_{\theta_j} \mathcal{L}_{T_j}^{S_j^X}(B_{\theta_j})$ 6:        Update $\theta_j = \theta_j - \alpha \dfrac{\partial B_{\theta_j}}{\partial \theta_j}$

```
                    Algorithm 2: INNER_LOOP

7:       end for
    8:       Evaluate query loss $\mathcal{L}_{T_j}^{Q_j^x}$ ($B_{\theta_j}$) and save it for outer loop
    9:       end for
    10:   end function
```

As mentioned, in some embodiments, the multilingual meta-distillation system 102 utilizes few-shot learning or zero-shot learning to perform multilingual semantic search. For example, as illustrated in FIG. 3, the multilingual meta-distillation system 102 utilizes the learned parameters of the language model to predict a multilingual search result (e.g., Target) for a new search request.

Figure 4:
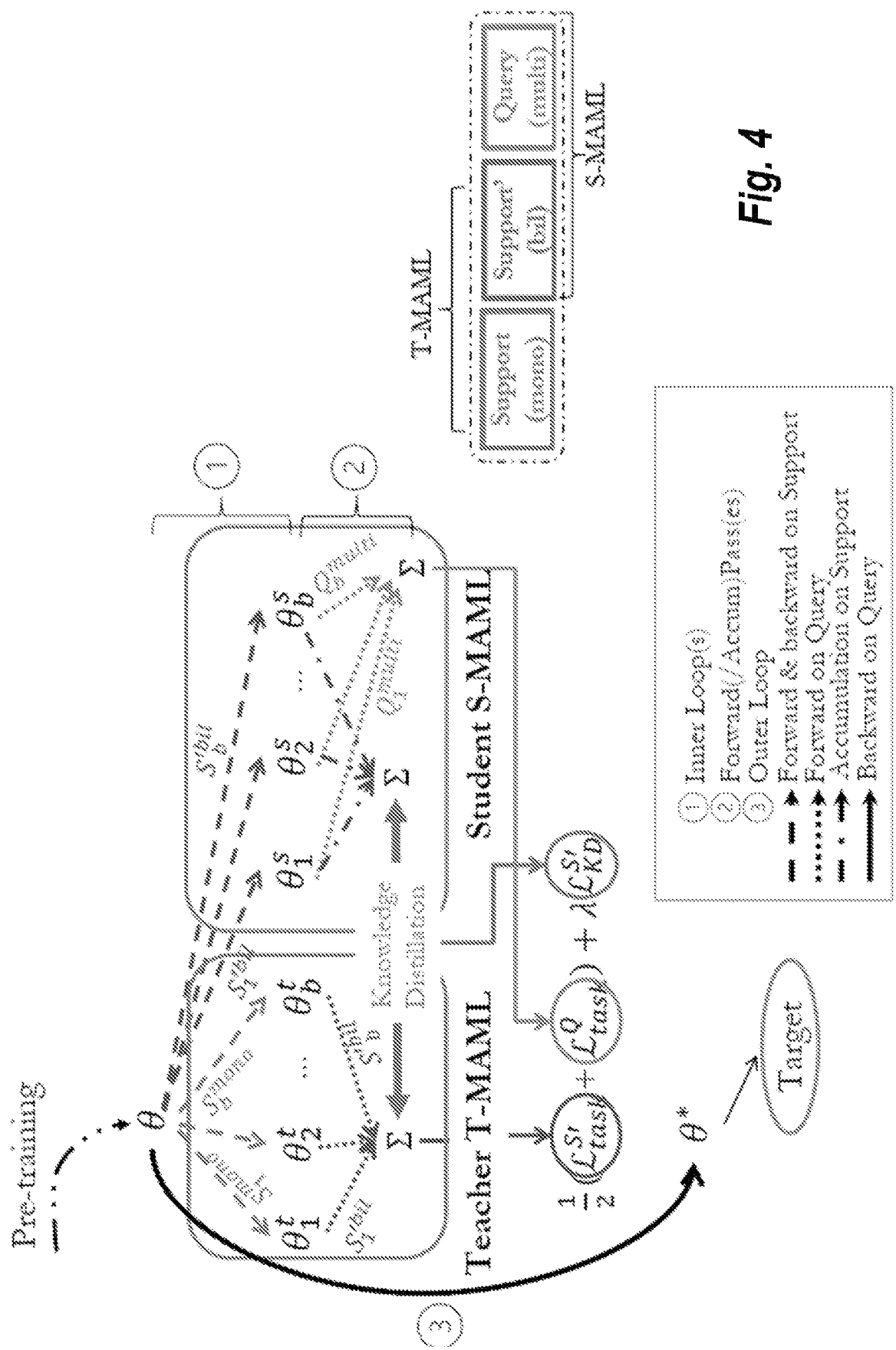
FIG. 4 illustrates the multilingual meta-distillation system aligning two meta-learners utilizing knowledge distillation for multilingual semantic search in accordance with one or more embodiments.

As mentioned, in some embodiments, the multilingual meta-distillation system 102 utilizes model-agnostic meta-learning (MAML) and knowledge distillation to train a language model to perform multilingual semantic search. For instance, FIG. 4 illustrates the multilingual meta-distillation system 102 aligning two MAML meta-learners utilizing knowledge distillation (MAML-Align) for multilingual semantic search in accordance with one or more embodiments. Specifically, FIG. 4 shows the multilingual meta-distillation system 102 updating parameters of a meta-learning teacher model (Teacher T-MAML) and updating parameters of a meta-learning student model (Student S-MAML) in an aligned fashion using knowledge distillation.

In particular, as illustrated, the multilingual meta-distillation system 102 receives parameters of a pre-trained learner. The multilingual meta-distillation system 102 initializes meta-learner parameters θ with the pre-trained learner parameters. The multilingual meta-distillation system 102 samples a batch of meta-tasks from meta-dataset distributions for each meta-learner. To illustrate, the multilingual meta-distillation system 102 samples, for the meta-learning teacher model, a batch of tasks from a meta-dataset distribution that simulates the transfer from monolingual semantic search to bilingual semantic search. Additionally, the multilingual meta-distillation system 102 samples, for the meta-learning student model, a batch of tasks from a meta-dataset distribution that simulates the transfer from bilingual semantic search to multilingual semantic search.

For each batch of meta-tasks, the multilingual meta-distillation system 102 performs an inner learning loop over each meta-task. For example, for the teacher model, the multilingual meta-distillation system 102 updates parameters $\theta_j^t = \theta_1^t, \theta_2^t, \ldots, \theta_b^t$ using a first support set $S_1^{mono}$, $S_2^{mono}, \ldots, S_b^{mono}$ for the monolingual search task. Additionally, the for the student model, the multilingual meta-distillation system 102 updates parameters $\theta_j^s = \theta_1^s, \theta_2^s, \ldots, \theta_b^s$ using a second support set $S_1^{bil}$, $S_2^{bil}, \ldots, S_b^{bil}$ for the bilingual search task. In particular, the multilingual meta-distillation system 102 updates the parameters of the teacher model based on a support loss for the monolingual to bilingual meta-learning task, and updates the parameters of the student model based on a support loss for the bilingual to multilingual meta-learning task. Additionally, the multilingual meta-distillation system 102 generates a first query loss based on the updated parameters of the teacher model and a second query loss based on the updated parameters of the student model.

As further shown in FIG. 4, at the end of each inner loop, the multilingual meta-distillation system 102 utilizes forward passes to determine the query losses for the parameters $\theta_j^t$ and $\theta_j^s$ using, respectively, the second support set $S_1^{bil}$, $S_2^{bil}, \ldots, S_b^{bil}$ and a query set $Q_1^{multi}, S_2^{multi}, \ldots, S_b^{multi}$. Thus, in some implementations, the support set for the meta-learning student model functions as a query set for the meta-learning teacher model. To further illustrate, in some implementations, the multilingual meta-distillation system 102 trains the meta-learning teacher model with one set (e.g., the first support set) and validates the meta-learning teacher model with another set (e.g., the second support set). Additionally, in some implementations, the multilingual meta-distillation system 102 trains the meta-learning student model with one set (e.g., the second support set) and validates the meta-learning student model with another set (e.g., the query set).

As mentioned, in some embodiments, the multilingual meta-distillation system 102 utilizes the same meta-learning dataset (e.g., the second support set) as both a training set for the meta-learning student model and as a validation set for the meta-learning teacher model. As also mentioned, in some embodiments, the second support set includes meta-learning tasks for bilingual semantic search. By utilizing the same set for these two purposes, in some embodiments, the multilingual meta-distillation system 102 provides an intersection (e.g., bilingual semantic search tasks) for the two meta-learning models (i.e., the teacher and the student). In this way, the multilingual meta-distillation system 102 improves the transfer from monolingual semantic search to multilingual semantic search by stepping through an intermediate meta-learning task that functions as an alignment point between the two meta-learning models.

As part of the forward passes shown in FIG. 4, the multilingual meta-distillation system 102 determines support losses for the parameters $\theta_j^s$ of the meta-learning student model utilizing the second support set $S_1^{bil}$, $S_2^{bil}, \ldots, S_b^{bil}$. The multilingual meta-distillation system 102 then compares the support losses for the student model with the query losses for the teacher model to determine a knowledge distillation loss.

As just mentioned, the multilingual meta-distillation system 102 determines a knowledge distillation loss by comparing one or more query losses for the teacher model with one or more support losses for the student model. In particular, the multilingual meta-distillation system 102 utilizes knowledge distillation to distill knowledge from the meta-learning teacher model to the meta-learning student model, thereby improving the generalization of MAML across different modes of transfer. Given that the meta-learning teacher model transfers from a monolingual semantic search task to a bilingual semantic search task, and given that the meta-learning student model transfers from a bilingual semantic search task to a multilingual semantic search task, the multilingual meta-distillation system 102 utilizes the shared mode of transfer (i.e., bilingual semantic search) to align different modes of transfer of semantic search.

Upon executing the two inner loops and the forward passes on the query and support, in some implementations, the multilingual meta-distillation system 102 utilizes an optimization process in an outer learning loop to update parameters of the meta-learning models. For instance, the multilingual meta-distillation system 102 determines a task loss based on a weighted combination of the query losses. To illustrate, the multilingual meta-distillation system 102 generates the task loss by combining a plurality of first query losses from the first inner learning loop and a plurality of second query losses from the second inner learning loop. Additionally, the multilingual meta-distillation system 102 determines the knowledge distillation loss based on a comparison of the query loss of the teacher model and the support loss of the student model. The multilingual meta-distillation system 102 evaluates a gradient of the task loss and the knowledge distillation loss to update parameters of the meta-learning models and the language model.

The MAML-Align process as described herein is represented symbolically in Algorithm 3, shown below. Algorithm 3 utilizes Algorithm 2 (the inner learning loop shown above) in like manner to Algorithm 1.

---

Algorithm 3: MAML-Align - Knowledge distillation to align two different MAMLs
(X → Y → Z)

---

Obtain task set distributions $\mathcal{D}_{X \to Y}$ and $\mathcal{D}_{Y \to Z}$ sharing the same Y, pre-trained learner B with parameters $\theta_B$, and meta-learners $M_{X \to Y}$ with parameters ($\theta$, $\alpha$, $\beta$, n) and $M_{Y \to Z}$ with parameters ($\theta'$, $\alpha$, $\beta'$, n'), where n' < n.

1:   Initialize $\theta \leftarrow \theta_B$
2:   Initialize $\theta' \leftarrow \theta_B$
3:   while not done do
4:     Sample a batch of tasks $\mathcal{T}_{X \to Y} = \{T_1, \ldots, T_b\} \sim \mathcal{D}_{X \to Y}$
5:     Sample a batch of tasks $\mathcal{T}_{Y \to Z} = \{T_1, \ldots, T_b\} \sim \mathcal{D}_{Y \to Z}$
6:     $\mathcal{L}_{T_j}^{S_j^X}, \mathcal{L}_{T_j}^{Q_j^Y} = \text{INNER\_LOOP}(\mathcal{T}_{X \to Y}, \theta, \alpha, n)$
7:     $\mathcal{L}_{T_j}^{S_j^Y}, \mathcal{L}_{T_j}^{Q_j^Z} = \text{INNER\_LOOP}(\mathcal{T}_{Y \to Z}, \theta', \alpha, n')$
8:     $\mathcal{L}_{task} = \sum_{j=1}^{b} \dfrac{\mathcal{L}_{T_j}^{Q_j^Y}(B_{\theta_j}) + \mathcal{L}_{T_j}^{Q_j^Z}(B_{\theta_j})}{2}$
9:     $\mathcal{L}_{kd} = \text{KL}\left(\sum_{j=1}^{b} \mathcal{L}_{T_j}^{Q_j^Y}(B_{\theta_j}), \sum_{j=1}^{b} \mathcal{L}_{T_j}^{S_j^Y}(B_{\theta_j})\right)$
10:     Update $\theta \leftarrow \theta - \beta \nabla_\theta (\mathcal{L}_{task} + \lambda \mathcal{L}_{kd})$
11:   end while

---

In Algorithm 3, the multilingual meta-distillation system 102 implements knowledge distillation by determining the knowledge distillation loss $\mathcal{L}_{kd}$. In some embodiments, the multilingual meta-distillation system 102 determines the knowledge distillation loss by determining a KL divergence between the query loss for the teacher model and the support loss for the student model.

As mentioned, in some embodiments, the multilingual meta-distillation system 102 utilizes few-shot learning or zero-shot learning to perform multilingual semantic search. For example, as illustrated in FIG. 4, the multilingual meta-distillation system 102 utilizes the learned parameters of the language model to predict a multilingual search result (e.g., Target) for a new search request.

As discussed above, in some embodiments, the multilingual meta-distillation system 102 performs multilingual semantic search. For instance, FIG. 5 illustrates the multilingual meta-distillation system 102 evaluating a search request to provide a search result in a plurality of languages in accordance with one or more embodiments.

Figure 5:
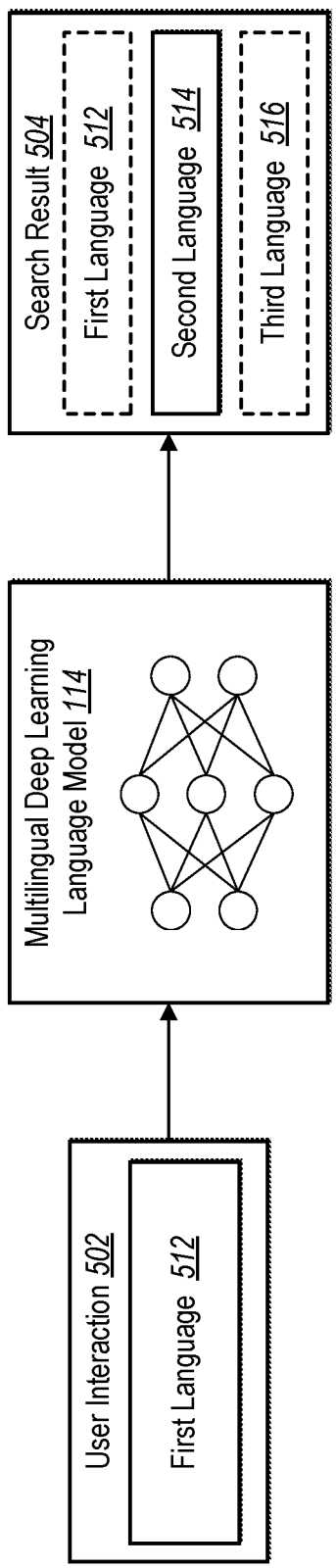
FIG. 5 illustrates the multilingual meta-distillation system evaluating a search request to provide a search result in a plurality of languages in accordance with one or more embodiments.

Specifically, FIG. 5 shows the multilingual meta-distillation system 102 receiving a user interaction 502. In some embodiments, the user interaction 502 includes a request for a semantic search result. To illustrate, the multilingual meta-distillation system 102 receives the user interaction 502 in a first language 512, and the user interaction 502 includes a sentence-level question.

In some embodiments, a user interaction includes an input via a computing device comprising a search query or a search request. For example, a user interaction includes a question or other semantic input to request information. In some implementations, a search result includes a response to the user interaction. For example, a search result includes a sentence-level search result, such as a sentence or passage indicating an answer to a question. In some implementations, a multilingual sentence-level search result includes a search result expressed in a plurality of languages that includes sentences or passages (e.g., one or more paragraphs) in response to a search query. For instance, a multilingual sentence-level search result includes a sentence (or passage) in a first language and a sentence (or passage) in a second language, both in response to the search query.

As further illustrated in FIG. 5, in some implementations, the multilingual meta-distillation system 102 processes the user interaction 502 through the multilingual deep learning language model 114. For instance, the multilingual meta-distillation system 102 utilizes the multilingual deep learning language model 114 to generate a search result 504 in response to the user interaction 502. For example, the multilingual meta-distillation system 102 utilizes the multilingual deep learning language model 114 with parameters learned utilizing the MAML or MAML-Align techniques described above (e.g., meta-learning and knowledge distillation).

In some implementations, the search result 504 is a multilingual search result. In particular, the multilingual meta-distillation system 102 provides the search result 504 in a plurality of languages. For example, in some cases, the multilingual meta-distillation system 102 provides the search result 504 including a portion of the search result 504 in the first language 512 (i.e., the language of the user interaction 502) and another portion of the search result 504 in a second language 514. As another example, in some cases, the multilingual meta-distillation system 102 provides the search result 504 in languages different from the first language 512. For instance, the search result 504 includes a portion in a second language 514 and another portion in a third language 516.

In some implementations, the search result 504 is a sentence-level search result. For instance, in response to a question (e.g., the user interaction 502), the multilingual meta-distillation system 102 generates a plurality of sentence-level answers (e.g., the search result 504) in multiple languages. To illustrate, the multilingual meta-distillation system 102 generates an encoded question from the question of the user interaction 502. For example, the multilingual meta-distillation system 102 encodes the question utilizing the multilingual deep learning language model 114 into a latent feature vector space.

Additionally, in some implementations, the multilingual meta-distillation system 102 generates encoded answers to the question of the user interaction 502. For instance, the multilingual meta-distillation system 102 obtains candidate answers and encodes the candidate answers utilizing the multilingual deep learning language model 114 into the latent feature vector space. In some cases, the multilingual meta-distillation system 102 includes context (e.g., in addition to the candidate answers) in the encoded answers.

As discussed above, in some implementations, the multilingual meta-distillation system 102 generates a plurality of answers in multiple languages. For example, the multilingual meta-distillation system 102 generates a plurality of encoded answers from candidate answers in a plurality of languages. In some embodiments, the multilingual meta-distillation system 102 selects a subset of the plurality of encoded answers to provide in the search result 504. For example, the multilingual meta-distillation system 102 compares the encoded question with an encoded answer. For instance, the multilingual meta-distillation system 102 determines a similarity score for the comparison of the encoded question with the encoded answer. In some embodiments, the multilingual meta-distillation system 102 selects a number (e.g., a predetermined number) of candidate answers with highest ranked similarity scores. In some embodiments, the multilingual meta-distillation system 102 selects candidate answers with similarity scores exceeding a predetermined threshold. The multilingual meta-distillation system 102 provides the selected candidate answers as answers within the search result 504.

As mentioned, in some embodiments, the multilingual meta-distillation system 102 provides a multilingual search result. For instance, FIGS. 6A and 6B illustrate the multilingual meta-distillation system 102 receiving a user interaction from a client device and providing a multilingual search result for display via the client device in accordance with one or more embodiments.

Figure 6A:
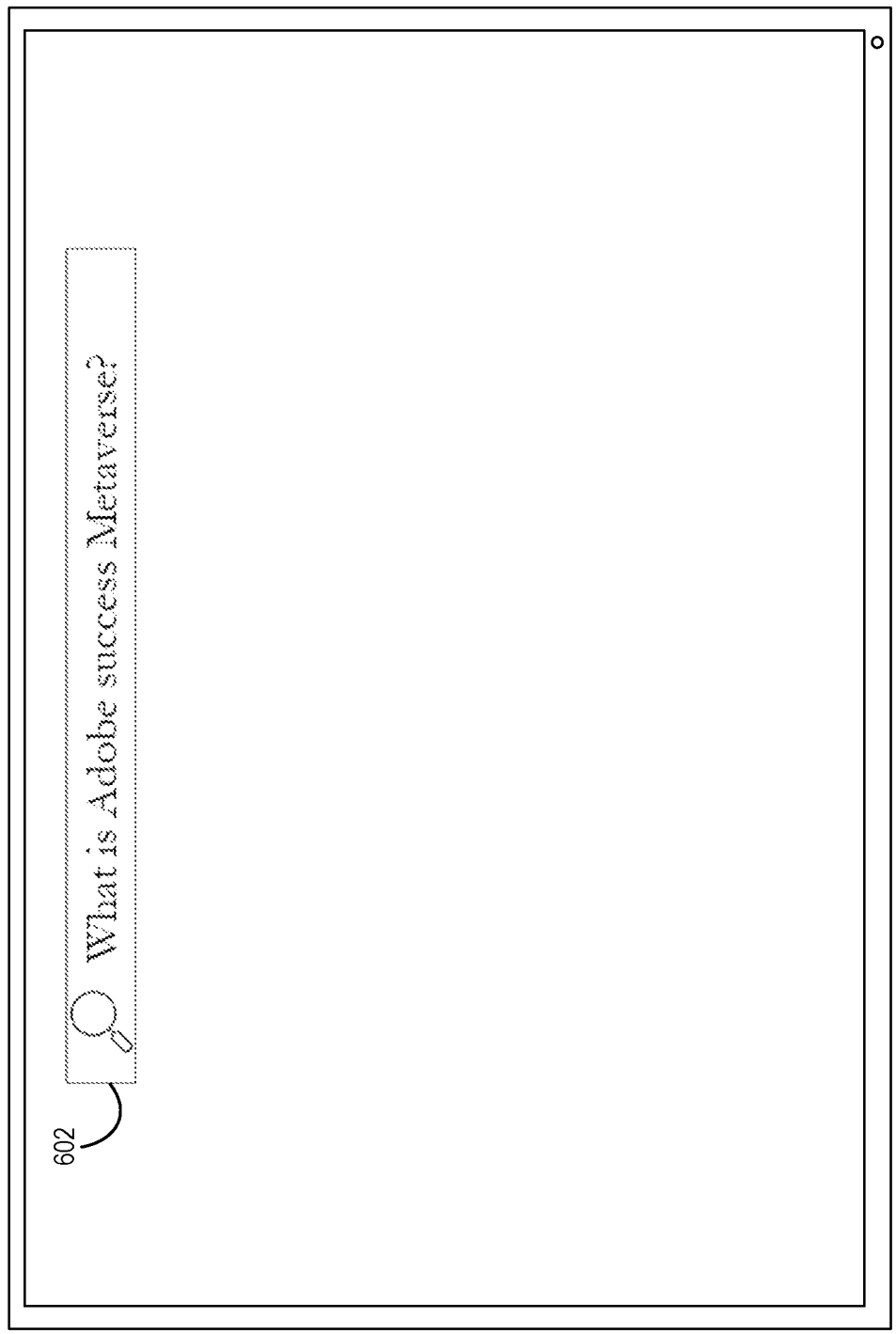
FIGS. 6A-6B illustrate the multilingual meta-distillation system receiving a user interaction via a client device and providing a multilingual search result for display via the client device in accordance with one or more embodiments.

Specifically, FIG. 6A shows a graphical user interface of a client device displaying a user interaction. To illustrate, the multilingual meta-distillation system 102 receives, from the client device, the user interaction. In some cases, the user interaction includes a request for a semantic search result. For example, the multilingual meta-distillation system 102 receives a question 602 requesting an answer. By way of example and not limitation, FIG. 6A illustrates the multilingual meta-distillation system 102 receiving the question 602 in the English language (e.g., "What is Adobe success Metaverse?").

Figure 6B:

FIG. 6B shows the graphical user interface of the client device displaying search results to the user interaction. To illustrate, the multilingual meta-distillation system 102 provides multilingual sentence-level search results for display via the client device (e.g., via the graphical user interface). For example, the multilingual meta-distillation system 102 generates, in response to the question 602, sentence-level answers in a plurality of languages. By way of example and not limitation, FIG. 6B illustrates the multilingual meta-distillation system 102 providing an answer 612 in the English language and an additional answer 614 in the Arabic language.

As mentioned, in some embodiments, the multilingual meta-distillation system 102 improves upon conventional systems for performing semantic search. For instance, FIGS. 7A and 7B illustrate evaluation results for the multilingual meta-distillation system 102 in accordance with one or more embodiments.

Figure 7A:
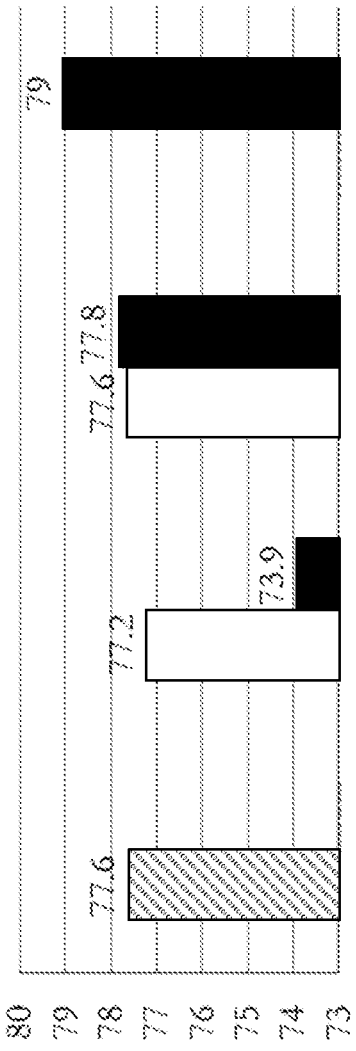
FIGS. 7A-7B illustrate evaluation results for the multilingual meta-distillation system in accordance with one or more embodiments.
Figure 7B:
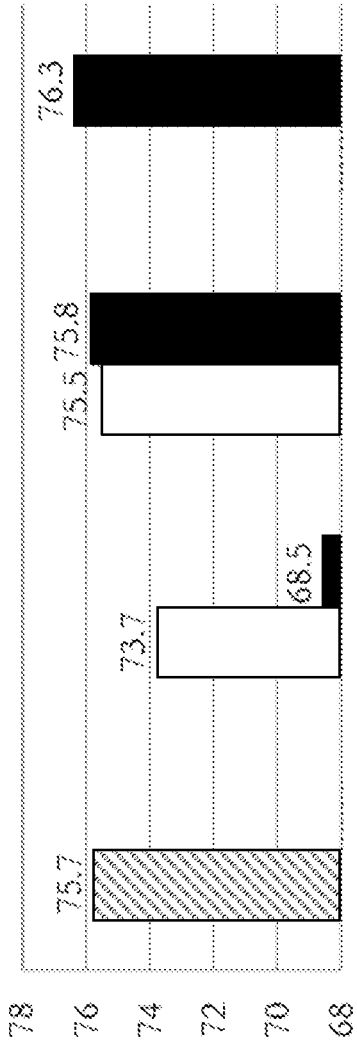

Specifically, FIGS. 7A and 7B highlight a comparison between different model categories on two languages and language pairs using the Pearson correlation coefficient percentage. These figures demonstrate a gain in favor of the meta-learning approaches described herein, consistent across different languages and language pairs, including languages used for zero-shot learning.

In particular, FIG. 7A shows results of a few-shot evaluation on Arabic-Arabic evaluated on $STSB_{Multi}$. This showcases monolingual performances on Arabic-Arabic, where Arabic is covered in few-shot learning. As shown in the figure, there are consistent gains in favor of meta-learning (MAML) and meta-distillation learning (MAML-Align) compared to fine-tuning approaches and off-the-shelf models for all types of evaluations.

Furthermore, FIG. 7B shows results of a few-shot evaluation on Turkish-English evaluated on $STSB_{Multi}$. This showcases bilingual performances on Turkish-English, where Turkish and English are covered in few-shot learning. As shown in the figure, there are consistent gains in favor of meta-learning (MAML) and meta-distillation learning (MAML-Align) compared to fine-tuning approaches and off-the-shelf models for all types of evaluations.

Figure 8:
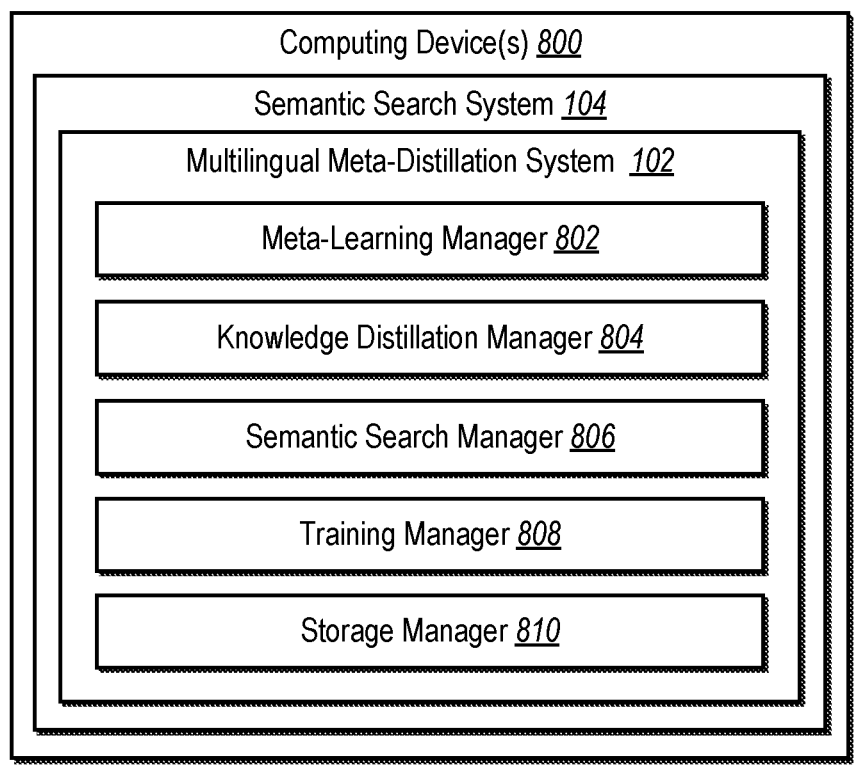
FIG. 8 illustrates a diagram of an example architecture of the multilingual meta-distillation system in accordance with one or more embodiments.

Turning now to FIG. 8, additional detail will be provided regarding components and capabilities of one or more embodiments of the multilingual meta-distillation system 102. In particular, FIG. 8 illustrates an example multilingual meta-distillation system 102 executed by a computing device(s) 800 (e.g., the server device(s) 106 or the client device 108). As shown by the embodiment of FIG. 8, the computing device(s) 800 includes or hosts the semantic search system 104 and/or the multilingual meta-distillation system 102. Furthermore, as shown in FIG. 8, the multilingual meta-distillation system 102 includes a meta-learning manager 802, a knowledge distillation manager 804, a semantic search manager 806, a training manager 808, and a storage manager 810.

As shown in FIG. 8, the multilingual meta-distillation system 102 includes a meta-learning manager 802. In some embodiments, the meta-learning manager 802 utilizes meta-learning to transfer a meta-learning model from one semantic retrieval task to another semantic retrieval task. For example, the meta-learning manager 802 determines a query loss and reports the query loss to the multilingual meta-distillation system 102 for learning parameters of the meta-learning model. As another example, the meta-learning manager 802 determines a task loss and reports the task loss to the multilingual meta-distillation system 102 for learning parameters of a deep learning language model.

In addition, as shown in FIG. 8, the multilingual meta-distillation system 102 includes a knowledge distillation manager 804. In some embodiments, the knowledge distillation manager 804 performs knowledge distillation to align a meta-learning student model with a meta-learning teacher model. For instance, the knowledge distillation manager 804 determines a knowledge distillation loss and reports the knowledge distillation loss to the multilingual meta-distillation system 102 for learning parameters of a deep learning language model.

Moreover, as shown in FIG. 8, the multilingual meta-distillation system 102 includes a semantic search manager 806. In some embodiments, the semantic search manager 806 receives a user interaction requesting a semantic search result and provides a multilingual sentence-level search result for display via a client device. For example, the semantic search manager 806 generates the multilingual sentence-level search result utilizing a multilingual deep learning language model as described herein.

Furthermore, as shown in FIG. 8, the multilingual meta-distillation system 102 includes a training manager 808. In some embodiments, the training manager 808 trains (e.g., learns parameters of) one or more machine learning models, as described above, including a deep learning language model, a meta-learning teacher model, and/or a meta-learning student model.

Additionally, as shown in FIG. 8, the multilingual meta-distillation system 102 includes a storage manager 810. In some embodiments, the storage manager 810 stores information (e.g., via one or more memory devices) on behalf of the multilingual meta-distillation system 102. For example, the storage manager 810 includes one or more language models and their parameters, one or more meta-learners (e.g., a meta-learning teacher model, a meta-learning student model) and their parameters, one or more meta-adapters and their parameters, task set distributions (e.g., batches of tasks), support sets, query sets, support losses, query losses, task losses, knowledge distillation losses, semantic search inputs (e.g., questions), and/or semantic search results (e.g., candidate answers, context, etc.).

Each of the components 802-810 of the multilingual meta-distillation system 102 can include software, hardware, or both. For example, the components 802-810 can include one or more instructions stored on a computer-readable storage medium and executable by processors of one or more computing devices, such as a client device or server device. When executed by the one or more processors, the computer-executable instructions of the multilingual meta-distillation system 102 can cause the computing device(s) to perform the methods described herein. Alternatively, the components 802-810 can include hardware, such as a special purpose processing device to perform a certain function or group of functions. Alternatively, the components 802-810 of the multilingual meta-distillation system 102 can include a combination of computer-executable instructions and hardware.

Furthermore, the components 802-810 of the multilingual meta-distillation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-810 may be implemented as a stand-alone application, such as a desktop or mobile application. Furthermore, the components 802-810 may be implemented as one or more web-based applications hosted on a remote server. The components 802-810 may also be implemented in a suite of mobile device applications or "apps." To illustrate, the components 802-810 may be implemented in an application, including but not limited to Adobe Acrobat, Adobe Captivate, Adobe Creative Cloud, Adobe Document Cloud, and Adobe Photoshop. The foregoing are either registered trademarks or trademarks of Adobe in the United States and/or other countries.

Figure 9:
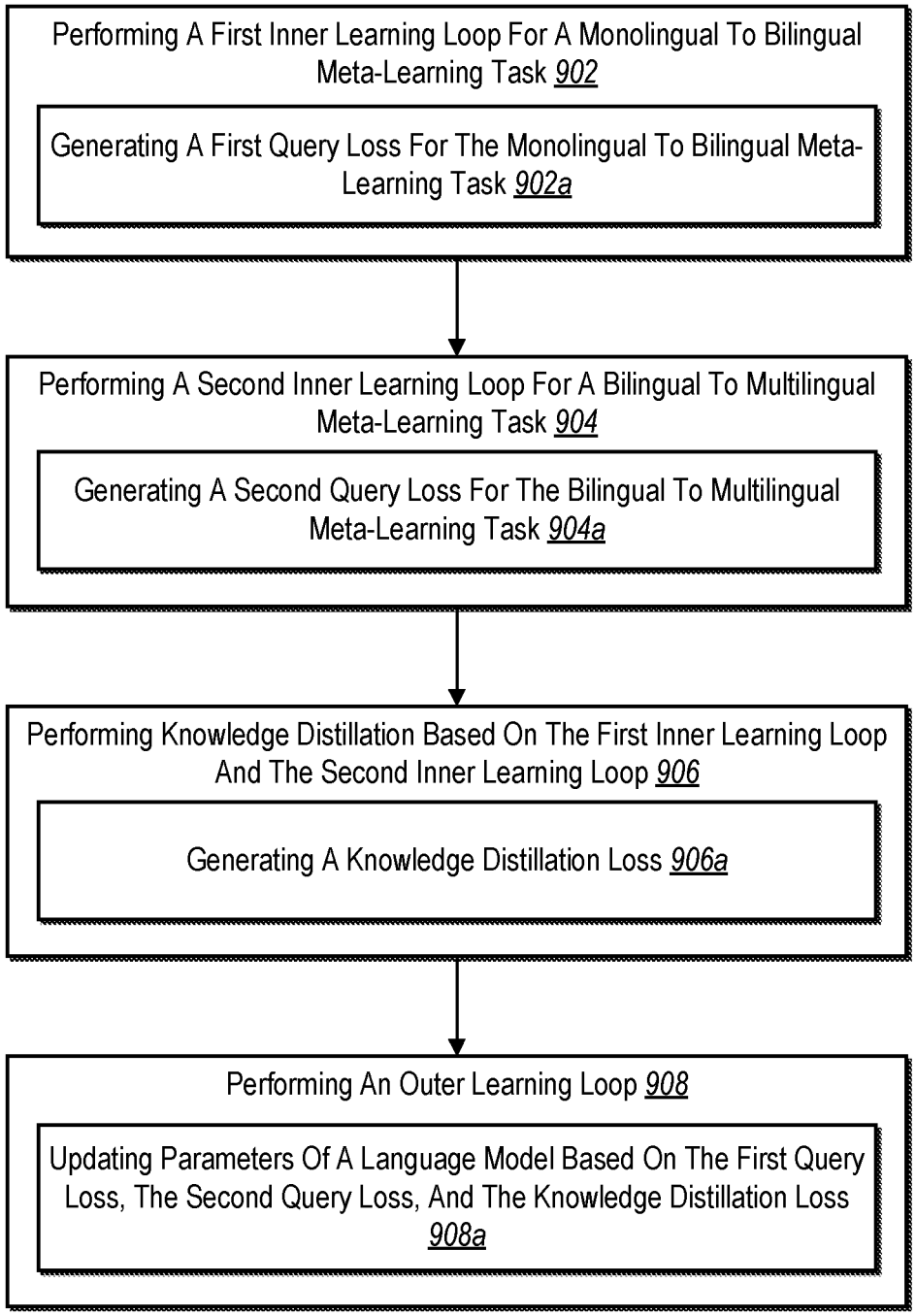
FIG. 9 illustrates a flowchart of a series of acts for learning parameters of a deep learning language model utilizing meta-learning and knowledge distillation in accordance with one or more embodiments.

FIGS. 1-8, the corresponding text, and the examples provide a number of different methods, systems, devices, and non-transitory computer-readable media of the multilingual meta-distillation system 102. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for learning parameters of a deep learning language model utilizing meta-learning and knowledge distillation to cause the deep learning language model to perform multilingual search retrieval, in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 of performing a first inner learning loop for a monolingual to bilingual meta-learning task, an act 904 of performing a second inner learning loop for a bilingual to multilingual meta-learning task, an act 906 of performing knowledge distillation based on the first inner learning loop and the second inner learning loop, and an act 908 of performing an outer learning loop. Additionally, as shown in FIG. 9, the series of acts 900 includes an act 902a of generating a first query loss for the monolingual to bilingual meta-learning task, an act 904a of generating a second query loss for the bilingual to multilingual meta-learning task, an act 906a of generating a knowledge distillation loss, and an act 908a of updating parameters of a language model based on the first query loss, the second query loss, and the knowledge distillation loss.

In particular, in some implementations, the act 902 includes performing a first inner learning loop for a monolingual to bilingual meta-learning task for a teacher model, the act 904 includes performing a second inner learning loop for a bilingual to multilingual meta-learning task for a student model, the act 906 includes performing knowledge distillation based on the first inner learning loop for the monolingual to bilingual meta-learning task and the second inner learning loop for the bilingual to multilingual meta-learning task, and the act 908 includes performing an outer learning loop and updating parameters of the deep learning language model based on the first inner learning loop, the second inner learning loop, and the knowledge distillation. For example, the series of acts 900 includes learning parameters of a deep learning language model utilizing meta-learning and knowledge distillation to cause the deep learning language model to perform multilingual search retrieval. To illustrate, in some implementations, the learning (of the parameters) comprises the acts 902, 904, 906, and 908.

Furthermore, in some implementations, the act 902a includes generating, utilizing a first inner loop of an alignment learner, a first query loss for a monolingual to bilingual meta-learning task for a teacher model, the act 904*a* includes generating, utilizing a second inner loop of the alignment learner, a second query loss for a bilingual to multilingual meta-learning task for a student model, the act 906*a* includes generating a knowledge distillation loss for the teacher model and the student model, and the act 908*a* includes updating parameters of a deep learning language model, utilizing an outer loop of the alignment learner, based on the first query loss, the second query loss, and the knowledge distillation loss.

In particular, in some implementations, the series of acts 900 includes performing the first inner learning loop by: updating parameters of the teacher model based on a support loss for the monolingual to bilingual meta-learning task; and generating a first query loss based on the updated parameters of the teacher model. Additionally, in some implementations, the series of acts 900 includes performing the second inner learning loop by: updating parameters of the student model based on a support loss for the bilingual to multilingual meta-learning task; and generating a second query loss based on the updated parameters of the student model.

Moreover, in some implementations, the series of acts 900 includes performing the knowledge distillation by comparing the first query loss and the support loss for the bilingual to multilingual meta-learning task. In addition, in some implementations, the series of acts 900 includes performing the outer learning loop by generating a task loss by combining a plurality of first query losses from the first inner learning loop and a plurality of second query losses from the second inner learning loop. Furthermore, in some implementations, the series of acts 900 includes updating the parameters of the deep learning language model by evaluating a gradient of the task loss and a knowledge distillation loss.

Additionally, in some implementations, the series of acts 900 includes generating the first query loss by utilizing the teacher model to evaluate a query set of the monolingual to bilingual meta-learning task. Moreover, in some implementations, the series of acts 900 includes generating the second query loss by utilizing the student model to evaluate a query set of the bilingual to multilingual meta-learning task. Furthermore, in some implementations, the series of acts 900 includes generating the knowledge distillation loss by comparing the first query loss for the monolingual to bilingual meta-learning task and a support loss for the bilingual to multilingual meta-learning task.

Moreover, in some implementations, the series of acts 900 includes determining a task loss by combining the first query loss and the second query loss. In addition, in some implementations, the series of acts includes updating the parameters of the deep learning language model by determining a gradient of the task loss combined with the knowledge distillation loss. Furthermore, in some implementations, the series of acts 900 includes sampling a first batch of monolingual to bilingual meta-learning tasks for the first inner loop of the alignment learner; sampling a second batch of bilingual to multilingual meta-learning tasks for the second inner loop of the alignment learner; and updating the parameters of the deep learning language model by utilizing the outer loop of the alignment learner to update parameters of the student model.

In some implementations, the series of acts 900 includes receiving, from a client device, a user interaction requesting a semantic search result; in response to the user interaction, generating a multilingual sentence-level search result utilizing a multilingual deep learning language model having parameters learned utilizing meta-learning and knowledge distillation; and providing the multilingual sentence-level search result for display via the client device.

For example, in some implementations, the series of acts 900 includes learning the parameters of the multilingual deep learning language model by performing a first inner learning loop for a monolingual to bilingual meta-learning task to generate a query loss for the monolingual to bilingual meta-learning task. Additionally, in some implementations, the series of acts 900 includes learning the parameters of the multilingual deep learning language model by performing a second inner learning loop for a bilingual to multilingual meta-learning task to generate a query loss for the bilingual to multilingual meta-learning task. Moreover, in some implementations, the series of acts 900 includes learning the parameters of the multilingual deep learning language model by generating a knowledge distillation loss based on a query loss for a monolingual to bilingual meta-learning task and a support loss for a bilingual to multilingual meta-learning task.

In some implementations, the series of acts 900 includes receiving the user interaction requesting a semantic search result by receiving an interaction in a first language and providing the multilingual sentence-level search result by providing a search result in a plurality of languages comprising the first language and a second language. Moreover, in some implementations, the series of acts 900 includes receiving the user interaction requesting a semantic search result by receiving an interaction in a first language and providing the multilingual sentence-level search result by providing a search result in a plurality of languages comprising a second language and a third language.

Furthermore, in some implementations, the series of acts 900 includes utilizing a transformer-based neural network as the multilingual deep learning language model. Additionally, in some implementations, the series of acts 900 includes generating the multilingual sentence-level search result by: encoding a question utilizing the multilingual deep learning language model to generate an encoded question; encoding a candidate answer and context utilizing the multilingual deep learning language model to generate an encoded answer; and comparing the encoded question and the encoded answer.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
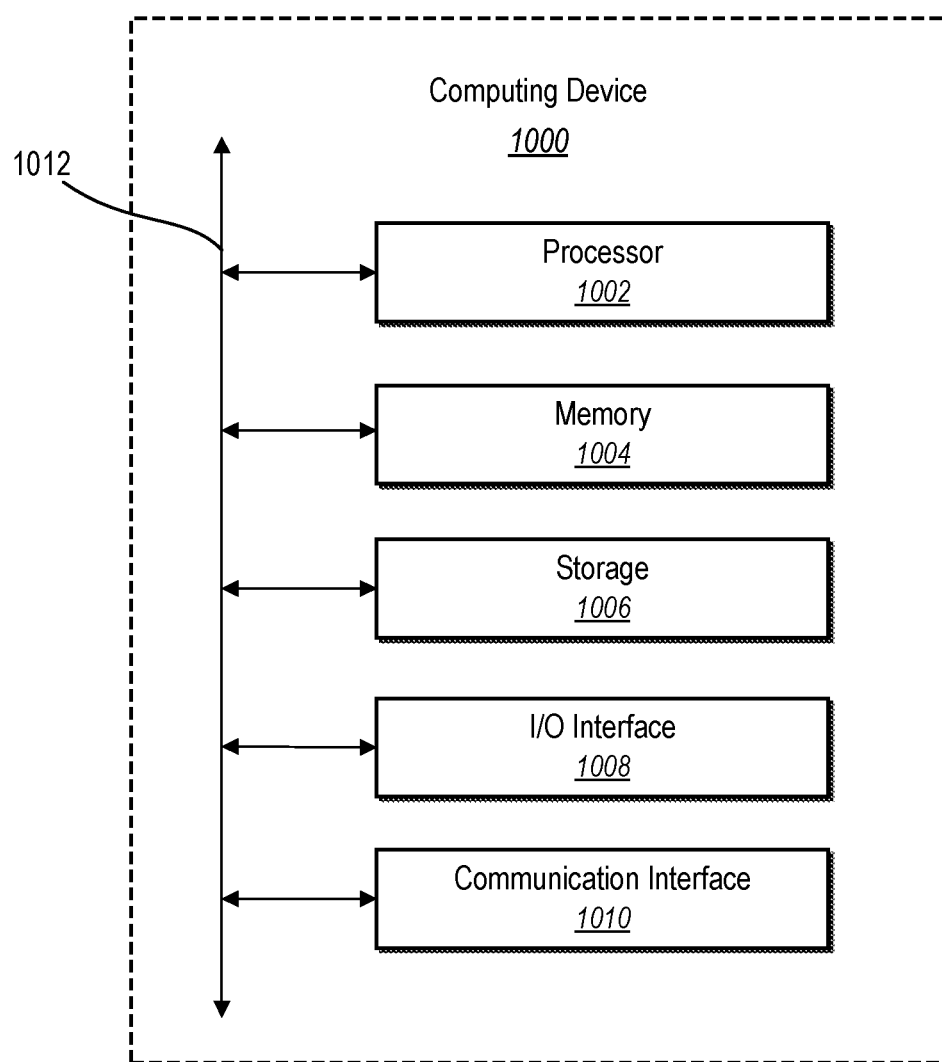
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the computing device(s) 800, the server device(s) 106, or the client device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes the memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes the storage device 1006 for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include the bus 1012. The bus 1012 can include hardware, software, or both that connects components of computing device 1000 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    learning parameters of a deep learning language model utilizing meta-learning and knowledge distillation to cause the deep learning language model to perform multilingual search retrieval comprising:
        performing a first inner learning loop for a monolingual to bilingual meta-learning task for a teacher model;
        performing a second inner learning loop for a bilingual to multilingual meta-learning task for a student model;
        performing knowledge distillation based on the first inner learning loop for the monolingual to bilingual meta-learning task and the second inner learning loop for the bilingual to multilingual meta-learning task; and
        performing an outer learning loop and updating parameters of the deep learning language model based on the first inner learning loop, the second inner learning loop, and the knowledge distillation.

2. The computer-implemented method of claim 1, wherein performing the first inner learning loop comprises:
    updating parameters of the teacher model based on a support loss for the monolingual to bilingual meta-learning task; and
    generating a first query loss based on the updated parameters of the teacher model.

3. The computer-implemented method of claim 2, wherein performing the second inner learning loop comprises:
    updating parameters of the student model based on a support loss for the bilingual to multilingual meta-learning task; and
    generating a second query loss based on the updated parameters of the student model.

4. The computer-implemented method of claim 3, wherein performing the knowledge distillation comprises comparing the first query loss and the support loss for the bilingual to multilingual meta-learning task.

5. The computer-implemented method of claim 1, wherein performing the outer learning loop comprises generating a task loss by combining a plurality of first query losses from the first inner learning loop and a plurality of second query losses from the second inner learning loop.

6. The computer-implemented method of claim 5, wherein updating the parameters of the deep learning language model comprises evaluating a gradient of the task loss and a knowledge distillation loss.

7. A system comprising:
one or more memory devices comprising a multilingual deep learning language model having parameters learned utilizing meta-learning and knowledge distillation, wherein the parameters of the multilingual deep learning language model are learned by generating a knowledge distillation loss based on a query loss for a monolingual to bilingual meta-learning task and a support loss for a bilingual to multilingual meta-learning task; and
one or more processors configured to cause the system to:
receive, from a client device, a user interaction requesting a semantic search result;
in response to the user interaction, generate a multilingual sentence-level search result utilizing the multilingual deep learning language model having parameters learned utilizing meta-learning and knowledge distillation; and
provide the multilingual sentence-level search result for display via the client device.

8. The system of claim 7, wherein the parameters of the multilingual deep learning language model are learned by performing a first inner learning loop for a monolingual to bilingual meta-learning task to generate a query loss for the monolingual to bilingual meta-learning task.

9. The system of claim 7, wherein the parameters of the multilingual deep learning language model are learned by performing a second inner learning loop for a bilingual to multilingual meta-learning task to generate a query loss for the bilingual to multilingual meta-learning task.

10. The system of claim 7, wherein generating the knowledge distillation loss comprises comparing the query loss for the monolingual to bilingual meta-learning task and the support loss for the bilingual to multilingual meta-learning task.

11. The system of claim 7, wherein the one or more processors are configured to cause the system to receive the user interaction requesting a semantic search result by receiving an interaction in a first language, and
wherein the one or more processors are configured to cause the system to provide the multilingual sentence-level search result by providing a search result in a plurality of languages comprising a second language and a third language.

12. The system of claim 7, wherein utilizing the multilingual deep learning language model comprises utilizing a transformer-based neural network.

13. The system of claim 7, wherein the one or more processors are configured to cause the system to generate the multilingual sentence-level search result by:

encoding a question utilizing the multilingual deep learning language model to generate an encoded question;
encoding a candidate answer and context utilizing the multilingual deep learning language model to generate an encoded answer; and
comparing the encoded question and the encoded answer.

14. A non-transitory computer-readable medium storing executable instructions that, when executed by a processing device, cause the processing device to perform operations comprising:
generating, utilizing a first inner loop of an alignment learner, a first query loss for a monolingual to bilingual meta-learning task for a teacher model;
generating, utilizing a second inner loop of the alignment learner, a second query loss for a bilingual to multilingual meta-learning task for a student model;
generating a knowledge distillation loss for the teacher model and the student model; and
updating parameters of a deep learning language model, utilizing an outer loop of the alignment learner, based on the first query loss, the second query loss, and the knowledge distillation loss.

15. The non-transitory computer-readable medium of claim 14, wherein generating the first query loss comprises utilizing the teacher model to evaluate a query set of the monolingual to bilingual meta-learning task.

16. The non-transitory computer-readable medium of claim 14, wherein generating the second query loss comprises utilizing the student model to evaluate a query set of the bilingual to multilingual meta-learning task.

17. The non-transitory computer-readable medium of claim 14, wherein generating the knowledge distillation loss comprises comparing the first query loss for the monolingual to bilingual meta-learning task and a support loss for the bilingual to multilingual meta-learning task.

18. The non-transitory computer-readable medium of claim 14, wherein the operations further comprise determining a task loss by combining the first query loss and the second query loss.

19. The non-transitory computer-readable medium of claim 18, wherein updating the parameters of the deep learning language model comprises determining a gradient of the task loss combined with the knowledge distillation loss.

20. The non-transitory computer-readable medium of claim 14, wherein the operations further comprise:
sampling a first batch of monolingual to bilingual meta-learning tasks for the first inner loop of the alignment learner;
sampling a second batch of bilingual to multilingual meta-learning tasks for the second inner loop of the alignment learner; and
updating the parameters of the deep learning language model by utilizing the outer loop of the alignment learner to update parameters of the student model.

* * * * *